(12) United States Patent
Ye et al.

(10) Patent No.: US 9,549,194 B2
(45) Date of Patent: Jan. 17, 2017

(54) CONTEXT BASED INVERSE MAPPING METHOD FOR LAYERED CODEC

(71) Applicant: Dolby Laboratories Licensing Corporation, San Francisco, CA (US)

(72) Inventors: Yan Ye, San Diego, CA (US); Alexandros Tourapis, Milpitas, CA (US); Peng Yin, Ithaca, NY (US); Yuwen He, San Diego, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 613 days.

(21) Appl. No.: 13/733,056

(22) Filed: Jan. 2, 2013

(65) Prior Publication Data

US 2013/0177066 A1    Jul. 11, 2013

Related U.S. Application Data

(60) Provisional application No. 61/584,805, filed on Jan. 9, 2012, provisional application No. 61/584,806, filed on Jan. 9, 2012.

(51) Int. Cl.

| | |
|---|---|
| H04N 19/10 | (2014.01) |
| H04N 19/187 | (2014.01) |
| H04N 19/59 | (2014.01) |
| H04N 19/44 | (2014.01) |
| H04N 19/36 | (2014.01) |
| H04N 19/172 | (2014.01) |
| H04N 19/103 | (2014.01) |
| H04N 19/182 | (2014.01) |

(Continued)

(52) U.S. Cl.
CPC .............. *H04N 19/44* (2014.11); *H04N 19/10* (2014.11); *H04N 19/103* (2014.11); *H04N 19/172* (2014.11); *H04N 19/182* (2014.11); *H04N 19/187* (2014.11); *H04N 19/33* (2014.11); *H04N 19/36* (2014.11); *H04N 19/537* (2014.11); *H04N 19/55* (2014.11); *H04N 19/59* (2014.11)

(58) Field of Classification Search
CPC ..... H04N 19/00006; H04N 7/26; H04N 19/44
See application file for complete search history.

(56) References Cited

U.S. PATENT DOCUMENTS

| | | |
|---|---|---|
| 5,202,760 A | 4/1993 | Tourtier et al. |
| 6,326,977 B1 | 12/2001 | Westerman |

(Continued)

FOREIGN PATENT DOCUMENTS

| | | |
|---|---|---|
| EP | 1093087 | 4/2001 |
| EP | 1827024 | 8/2007 |

(Continued)

OTHER PUBLICATIONS

ITU-T Recommendatiion H.264 "Advanced Video Coding for Generic Audiovisual Services", Mar. 2010.

(Continued)

*Primary Examiner* — Jay Patel
*Assistant Examiner* — Irfan Habib

(57) ABSTRACT

Context based inverse mapping methods are provided. An image with pixel values within a lower dynamic range can be mapped to an image with pixel values within a higher dynamic range by utilizing context information associated with pixels in the lower dynamic range image.

30 Claims, 5 Drawing Sheets

(51) Int. Cl.
  *H04N 19/33* (2014.01)
  *H04N 19/537* (2014.01)
  *H04N 19/55* (2014.01)

(56) References Cited

U.S. PATENT DOCUMENTS

| | | | |
|---|---|---|---|
| 6,873,368 B1 | 3/2005 | Yu et al. | |
| 7,840,078 B2* | 11/2010 | Segall | H04N 19/30 382/232 |
| 7,982,928 B2 | 7/2011 | Stauder | |
| 8,014,445 B2 | 9/2011 | Segall et al. | |
| 8,085,852 B2* | 12/2011 | Liu | H04N 19/105 358/1.9 |
| 8,130,828 B2* | 3/2012 | Hsu | H04N 19/126 348/27 |
| 8,477,853 B2* | 7/2013 | Wu | H04N 19/30 375/240.25 |
| 8,532,176 B2* | 9/2013 | Segall | H04N 19/40 375/240.11 |
| 8,594,178 B2 | 11/2013 | Li et al. | |
| 8,718,132 B2* | 5/2014 | Cho | H04N 19/105 375/240.01 |
| 8,743,969 B2* | 6/2014 | Sasai | H04N 19/197 375/240.26 |
| 8,774,269 B2* | 7/2014 | Marpe | H04N 19/00569 375/240.02 |
| 8,907,823 B2* | 12/2014 | Marpe | H03M 7/4006 341/107 |
| 8,934,542 B2* | 1/2015 | Wiegand | H04N 19/30 375/240.12 |
| 8,995,525 B2* | 3/2015 | Wiegand | H04N 19/593 375/240.02 |
| 9,030,579 B2* | 5/2015 | Yasuda | H04N 5/367 348/246 |
| 2003/0016884 A1 | 1/2003 | Altunbasak | |
| 2004/0169890 A1 | 9/2004 | Maurer | |
| 2005/0013509 A1 | 1/2005 | Samadani | |
| 2005/0259729 A1 | 11/2005 | Sun | |
| 2006/0020633 A1 | 1/2006 | Cho | |
| 2006/0024528 A1 | 2/2006 | Strangman et al. | |
| 2006/0083308 A1* | 4/2006 | Schwarz | H04N 19/0003 375/240.16 |
| 2006/0104533 A1 | 5/2006 | Daly et al. | |
| 2006/0233254 A1* | 10/2006 | Lee | H04N 19/70 375/240.16 |
| 2006/0268166 A1 | 11/2006 | Bossen et al. | |
| 2007/0201560 A1 | 8/2007 | Segall | |
| 2007/0211798 A1* | 9/2007 | Boyce | H04N 19/61 375/240.16 |
| 2007/0230564 A1* | 10/2007 | Chen | H04N 21/23432 375/240.01 |
| 2008/0007438 A1 | 1/2008 | Segall | |
| 2008/0008394 A1* | 1/2008 | Segall | H04N 19/176 382/238 |
| 2008/0137990 A1 | 6/2008 | Ward | |
| 2008/0193032 A1* | 8/2008 | Segall | H04N 19/176 382/251 |
| 2008/0310752 A1 | 12/2008 | Han | |
| 2009/0003718 A1 | 1/2009 | Liu et al. | |
| 2009/0086816 A1* | 4/2009 | Leontaris | H04N 19/176 375/240.03 |
| 2009/0097561 A1 | 4/2009 | Chiu et al. | |
| 2009/0110073 A1 | 4/2009 | Wu et al. | |
| 2009/0135915 A1* | 5/2009 | Marpe | H04N 19/176 375/240.18 |
| 2009/0225869 A1* | 9/2009 | Cho | H04N 19/105 375/240.26 |
| 2009/0262798 A1 | 10/2009 | Chiu | |
| 2009/0323808 A1 | 12/2009 | Lin | |
| 2010/0020866 A1* | 1/2010 | Marpe | H04N 19/00569 375/240.02 |
| 2011/0090959 A1* | 4/2011 | Wiegand | H04N 19/593 375/240.12 |
| 2011/0142132 A1 | 6/2011 | Tourapis et al. | |
| 2011/0194618 A1 | 8/2011 | Gish | |
| 2012/0070081 A1* | 3/2012 | Lukac | H04N 5/367 382/167 |
| 2012/0092452 A1 | 4/2012 | Tourapis et al. | |
| 2012/0236929 A1* | 9/2012 | Liu | H04N 19/00739 375/240.02 |
| 2013/0039426 A1* | 2/2013 | Helle | H04N 19/52 375/240.16 |
| 2013/0187798 A1* | 7/2013 | Marpe | H03M 7/4081 341/67 |
| 2013/0279577 A1* | 10/2013 | Schwarz | H04N 19/00569 375/240.12 |
| 2013/0300591 A1* | 11/2013 | Marpe | H03M 7/40 341/67 |

FOREIGN PATENT DOCUMENTS

| | | |
|---|---|---|
| EP | 2144444 | 1/2010 |
| JP | 2007243942 | 9/2007 |
| JP | 2008234315 | 10/2008 |
| RU | 2107406 | 3/1998 |
| WO | 2005/104035 | 11/2005 |
| WO | 2007/082562 | 7/2007 |
| WO | 2008/019524 | 2/2008 |
| WO | 2008/043198 | 4/2008 |
| WO | 2008/049445 | 5/2008 |
| WO | 2008/049446 | 5/2008 |
| WO | 2008/052007 | 5/2008 |
| WO | 2008/128898 | 10/2008 |
| WO | 2009/127231 | 10/2009 |
| WO | 2009/155398 | 12/2009 |
| WO | 2010/033565 | 3/2010 |
| WO | 2010/105036 | 9/2010 |
| WO | 2010/123855 | 10/2010 |
| WO | 2010/127692 | 11/2010 |
| WO | 2012/027405 | 3/2012 |
| WO | 2012/050758 | 4/2012 |
| WO | 2012/122421 | 9/2012 |
| WO | 2012/122423 | 9/2012 |
| WO | 2012/122425 | 9/2012 |
| WO | 2012/122426 | 9/2012 |

OTHER PUBLICATIONS

JVT Reference software Version H.264, Karsten Suhring, HHI.
Mansour, H. et al. "Color Image Desaturation Using Sparse Reconstruction" Acoustics Speech and Signal Processing, 2010, IEEE International Conference, pp. 778-781.
Didyk, P. et al. "Enhancement of Bright Video Features for HDR Displays" vol. 27 (2008), No. 4, published by Blackwell publishing.
Wang et al. "Spatially Scalable Video Coding with an Efficient Two-Layered Architecture" Multimedia Tools Appl. 48, Jun. 2010, pp. 247-265.
Li, J. et al. "Natural Neighbors Interpolation Method for Correcting IDW" Proc. SPIE, International Symposium on Spatial Analysis 7492 Oct. 2009.
Schwarz, H. et al. "Overview of the Scalable Video Coding Extension of the H.264/SVC Standard", IEEE Trans. on Circuits and Systems for Video Technology, vol. 17, No. 9, Sep. 2007.
Gao, Y. et al. "CE4: SVC bit-depth Scalability Simulation Results", Joint Video Team, Doc JVT-W 102, San Jose, CA, Apr. 2007.
Segall, A. et al. "System for bit-Depth Scalable Coding", Joint Video Team, Doc. JVT-W113, San Jose, CA, Apr. 2007.
Segall, A. "CE4: Verification JVT-W102 (Thomson Prop", Joint Video Team, Doc. JVT-W116, San Jose, CA, Apr. 2007.
Gao, Y. et al. "Simulation Results for CE2: SVC Bit-Depth Scalability" Joint Video Team, JVT-X051, Geneva, Switzerland, Jun. 2007.
Wu, Y. et al. "Study on Inter-Layer Prediction in Bit-Depth Scalability", Joint Video Team, JVT-X052, Geneva, Switzerland, Jun. 2007.
Winken, M. et al. "CE2: SVC Bit-Depth Scalability" Joint Video Team, JVT-X057, Geneva, Switzerland, Jun. 2007.

(56) References Cited

OTHER PUBLICATIONS

Gao, Y. et al. "AHG Report: SVC Bit Depth and Chroma Format" Joint Video Team, Doc. JVT-W010, San Jose, CA, Jan. 2007.

Segall, A. et al. "CE2: Inter-Layer Prediction for Bit-Depth Scalable Coding", Joint Video Team, JVT-X067, Geneva, Switzerland, Jun. 2007.

Liu, S. et al. "Inter-Layer Prediction for SVC Bit-Depth Scalable Coding", Joint Video Team, JVT-X075, Geneva Switzerland, Jun. 2007.

Ye, Y. et al. "Improvements to Bit Depth Scalability Coding", Joint Video Team, JVT-Y048, Schenzhen, China, Oct. 2007.

Segall, A. "CE1: Bit-Depth Scalability", Joint Video Team, JVT-X30IrI, Geneva, Switzerland, Jun. 2007.

Choi, J. et al. "High Dynamic Range Image Reconstruction with Spatial Resolution Enhancement" The Computer Journal Advance Access published Oct. 4, 2007.

Park, S. et al. "Hybrid Scalable, Video Codec for Bit-Depth Scalability", Optical Engineering, vol. 48, No. 1, Jan. 20, 2009, pp. 017002-1-017002-8.

Reinhard, E. et al. "Image Display Algorithms for High-and-Low Dynamic Range Display Devices" SID Journals, 1475 S. Bascom Ave., Ste. 114, Campbell, CA, USA. May 20-25, 2007.

Winken, M. et al. "Bit-Depth Scalable Video Coding" Image Processing, ICIP 2007, IEEE International Conference on IEEE, Sep. 1, 2007, pp. I-5-I-8.

Shan, Q. et al. "Globally Optimized Linear Windowed Tone Mapping" IEEE Transactions on Visualization and Computer Graphics, IEEE Service Center, Los Alamitos, CA USA, vol. 16, No. 4, Jul. 1, 2010, pp. 663-675.

G.W. Larson, "The LogLuv Encoding for Full Gamut, High Dynamic Range Images", Journal of Graphics Tools, 3 (1), pp. 15-31, 1998. Abstract Only.

S.H. Lim et al., "Denoising scheme for realistic digital photos from unknown sources", Acoustics, Speech and Signal Processing, 2009. ICASSP 2009. IEEE International Conference on, IEEE, Piscataway, NJ, USA, Apr. 19-24, 2009, pp. 1189-1192. Abstract Only.

R. Mantiuk, A. Efremov, K. Myszkowski, and H. P. Seidel, "Backward Compatible High Dynamic Range MPEG Video Compression," in Proc. of SIGGRAPH '06 (Special issue of ACM Transactions on Graphics), 25 (3), pp. 713-723, 2006.

R. Mantiuk, G. Krawczyk, K. Myszkowski, and H. P.Seidel, "High Dynamic Range Image and Video Compression—Fidelity Matching Human Visual Performance," in Proc. of IEEE International Conference on Image Processing 2007, pp. 9-12.

M.T. Orchard and G.J. Sullivan, "Overlapped block motion compensation: an estimation-theoretic approach," IEEE Trans. on Image Processing, vol. 3, No. 5, pp. 693-699, Sep. 1994. Abstract Only.

Rempel, et al., "Ldr2Hdr: On-the-Fly Reverse Tone Mapping of Legacy Video and Photographs", Proceedings of Siggraph 2007, ACM Trans. Graphics 26 (3), Aug. 2007. Abstract Only.

A. Smolic, et al., "Coding Algorithms for 3DTV—A Survey," in IEEE Transactions on Circuits and Systems for Video Technology, vol. 17, No. 11, pp. 1606-1621, Nov. 2007. Abstract Only.

G. Ward, and M. Simmons, "JPEG-HDR: A Backwards-Compatible, High Dynamic Range Extension to JPEG," Proceedings of the Thirteenth Color Imaging Conference, Nov. 2005, pp. 1-8.

G. Ward, "A General Approach to Backwards-Compatible Delivery of High Dynamic Range Images and Video," Proceedings of the Fourteenth Color Imaging Conference, Nov. 2006. 7 pgs.

Y. Wu et al., "Bit-depth scalability compatible to H.264/AVC-scalable extension", Journal of Visual Communication and Image Representation, vol. 19, No. 6, Aug. 1, 2008, pp. 372-381. Abstract Only.

Non-Final Office Action issued for U.S. Appl. No. 13/091,311 filed on Apr. 21, 2011 in the name of Walter Gish. Mail Date: May 22, 2014.

Notice of Allowance issued for U.S. Appl. No. 13/091,311 filed on Apr. 21, 2011 in the name of Walter Gish. Mail Date: Jan. 9, 2015.

\* cited by examiner

CONTEXT BASED INVERSE MAPPING METHOD FOR LAYERED CODEC

CROSS REFERENCE TO RELATED APPLICATIONS

The present application claims the benefit of priority to U.S. Provisional Patent Application Ser. No. 61/584,805 for "Context Based Inverse Mapping Method for Layered Codec", filed on Jan. 9, 2012, and U.S. Provisional Patent Application Ser. No. 61/584,806 for "Hybrid Reference Picture Reconstruction Method for Single and Multiple Layered Video Coding Systems", filed on filed on Jan. 9, 2012, the disclosure of which is incorporated herein by reference in its entirety. The present application is related to; International Application Ser. No. PCT/US2010/026953 for "Layered Compression Of High Dynamic Range, Visual Dynamic Range, and Wide Color Gamut Video", filed on Mar. 11, 2010; U.S. patent application Ser. No. 13/091,311 for "Compatible Compression Of High Dynamic Range, Visual Dynamic Range, and Wide Color Gamut Video", filed on Apr. 21, 2011; International Application Ser. No. PCT/US2011/048861 for "Extending Image Dynamic Range", filed on Aug. 23, 2011; and U.S. Provisional Application Ser. No. 61/582,614 for "Specifying Visual Dynamic Range Coding Operations and Parameters", filed on Jan. 3, 2012, the disclosure of each of which is incorporated herein by reference in its entirety.

TECHNICAL FIELD

The present invention relates generally to video coding. More particularly, an embodiment of the present invention relates to a context based inverse mapping method for layered codec.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

DESCRIPTION OF EXAMPLE EMBODIMENTS

Figure 1:
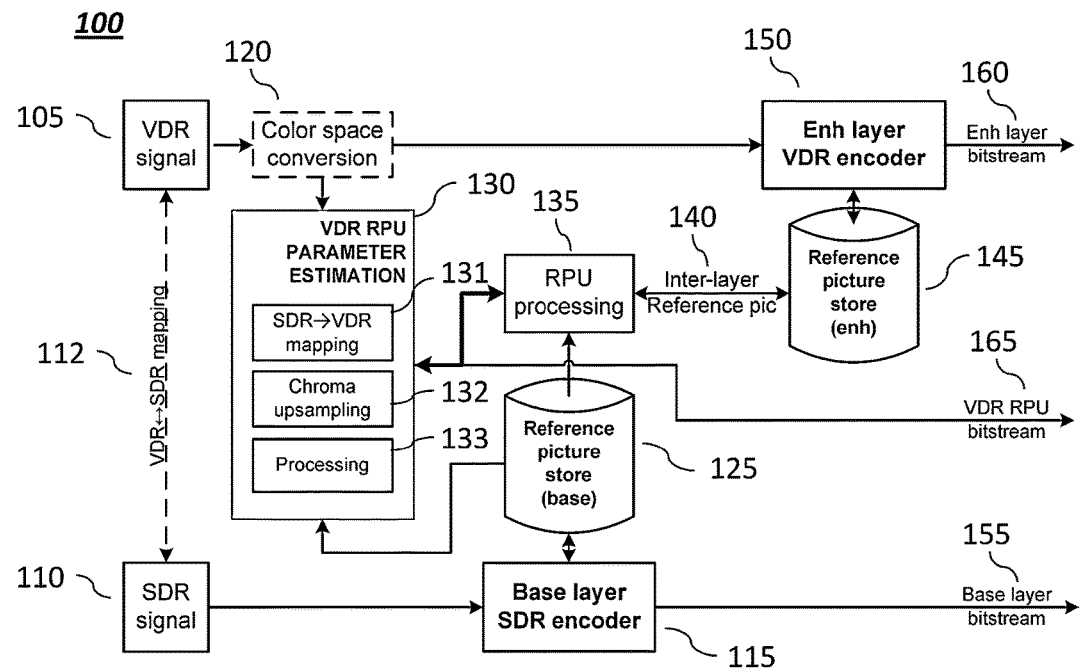
FIGS. 1 and 2 depict an example multi-layer encoding system and multi-layer decoding system, respectively.

In an example embodiment of the disclosure, a method of generating a second pixel based on a first pixel is presented, wherein a first image comprises the first pixel and a second image comprises the second pixel, the first image having a lower dynamic range and the second image having a higher dynamic range, the method comprising: providing a value of the first pixel; generating context information based on at least one pixel neighboring the first pixel; and computing a value of the second pixel based on the value of the first pixel and the context information of the at least one pixel to generate the second pixel.

In an example embodiment of the disclosure, a method of generating a second image based on a first image by inverse mapping the first image is presented, the first image comprising pixels with values of a lower dynamic range and the second image comprising pixels with values of a higher dynamic range, the method comprising: providing the first image; generating context information for one or more pixels in the first image, wherein context information associated with any particular pixel in the first image is based on at least one pixel neighboring the particular pixel; estimating an inverse mapping function from the generated context information and values of the one or more pixels in the first image, the inverse mapping function being adapted to map a value from the lower dynamic range to the higher dynamic range; and applying the inverse mapping function to the one or more pixels of the first image and, for each remaining pixel of the first image, inverse mapping the remaining pixel from the lower dynamic range to the higher dynamic range based on pixel value associated with the remaining pixel to generate the second image.

In an example embodiment of the disclosure, a method of encoding image information is presented, the method comprising: providing a first image and a second image, the first image comprising a lower dynamic range representation of the image information and the second image comprising higher dynamic range representation of the image information; encoding the first image to generate a first layer bitstream; reconstructing the first image to obtain a reconstructed first image, wherein the reconstructed first image is adapted to be stored in a first reference picture buffer; generating context information for one or more pixels in the reconstructed first image, wherein context information associated with any particular pixel in the one or more pixels based on at least one pixel neighboring the particular pixel; estimating an inverse mapping function from the generated context information and values of the one or more pixels in the reconstructed first image, the inverse mapping function being adapted to map a value from the lower dynamic range to the higher dynamic range; computing an estimated second image based on applying the inverse mapping function to the one or more pixels of the reconstructed first image and, for each remaining pixel of the reconstructed first image, inverse mapping the remaining pixel from the lower dynamic range to the higher dynamic range based on pixel value associated with the remaining pixel to generate the estimated second image, wherein the estimated second image is adapted to be stored in a second reference picture buffer; and encoding the estimated second image to generate a second layer bitstream.

In an example embodiment of the disclosure, a method of obtaining an inter-layer reference picture based on image information is presented, the method comprising: providing a first image and a second image, the first image comprising a lower dynamic range representation of the image information and associated with a first layer and the second image comprising a higher dynamic range representation of the image information and associated with a second layer; providing a first inverse mapping function, the first inverse mapping function being adapted to map a pixel value of the lower dynamic range to a pixel value of the higher dynamic range; partitioning the first and second images into one or more regions, a first set of pieces, and a second set of pieces; for any particular region among the one or more regions and any particular piece among the second set of pieces: (i) generating context information for one or more pixels in the particular region and the particular piece, wherein the particular region and the particular piece are of the provided first image, wherein context information associated with any particular pixel in the particular region and the particular piece is based on at least one pixel neighboring the particular pixel; (ii) estimating a second inverse mapping function from the generated context information and values of the one or more pixels in the particular region and the particular piece, the second inverse mapping function being adapted to map a value from the lower dynamic range to the higher dynamic range; (iii) computing a first estimated region and piece at the higher dynamic range based on applying the first inverse mapping function to each pixel of the particular region and the particular piece; (iv) computing a second estimated region and piece at the higher dynamic range based on applying the second inverse mapping function to the one or more pixels of the particular region and the particular piece and applying the first inverse mapping function to the remaining pixels of the particular region and the particular piece; (v) computing a first metric based on a difference between the first estimated region and piece and corresponding region and piece in the provided second image; (vi) computing a second metric based on a difference between the second estimated region and piece and corresponding region and piece in the provided second image; (vii) selecting either the first inverse mapping function or the second inverse mapping function based on the first cost metric and the second cost metric; and (viii) generating a region and piece of the inter-layer reference picture by applying the selected inverse mapping function to the one or more pixels in the particular region and the particular piece of the provided first image and applying the first inverse mapping function to the remaining pixels of the particular region and the particular piece; performing (i) through (viii) for each region and each piece in the one or more regions and one or more pieces of the first and second images to generate a portion of the inter-layer reference picture; and for any particular region among the one or more regions and any particular piece among the first set of pieces: applying the first inverse mapping function to generate a remaining portion of the inter-layer reference picture to obtain the inter-layer reference picture, wherein the inter-layer reference picture is adapted to be stored in a reference picture buffer.

In an example embodiment of the disclosure, a method for decoding one or more bitstreams is presented, the one or more bitstreams comprising a first layer bitstream associated with lower dynamic range information and a second layer bitstream associated with higher dynamic range information, the method comprising: extracting from the one or more bitstreams first layer image information and an one or more inverse mapping functions adapted to be applied to the first layer image information; reconstructing a first layer image from the first layer image information, wherein the first layer image is associated with a lower dynamic range and is adapted to be stored in a reference picture buffer; and generating a second layer image by applying the one or more inverse mapping functions to a plurality of pixels in the first layer image to decode the second layer bitstream, the plurality of pixels comprising at least one set of pixels, wherein each set of pixels is associated with one inverse mapping function among the one or more inverse mapping functions.

In an example embodiment of the disclosure, a system that is configured to generate a second pixel based on a first pixel is presented, wherein a first image comprises the first pixel and a second image comprises the second pixel, the first image having a lower dynamic range and the second image having a higher dynamic range, the system comprising: a context information generation module that is configured to generate context information based on at least one pixel neighboring the first pixel; and a computation module that is configured to receive the context information from the context information generation module and compute a value of the second pixel based on a value of the first pixel and the context information of the at least one pixel to generate the second pixel.

In an example embodiment of the disclosure, a system that is configured to generate a second image based on a first image by inverse mapping the first image is presented, the first image comprising pixels with values of a lower dynamic range and the second image comprising pixels with values of a higher dynamic range, the system comprising: a context information generation module that is configured to generate context information for one or more pixels in the first image, wherein context information associated with any particular pixel in the first image is based on at least one pixel neighboring the particular pixel; a curve fitting module that is configured to estimate an inverse mapping function from the generated context information and values of the one or more pixels in the first image, the inverse mapping function being adapted to map a value from the lower dynamic range to the higher dynamic range; and a computational module that is configured to apply the inverse mapping function to the one or more pixels of the first image and, for each remaining pixel of the first image, apply inverse mapping to the remaining pixel from the lower dynamic range to the higher dynamic range based on pixel value associated with the remaining pixel to generate the second image.

In an example embodiment of the disclosure, an encoding system that is configured to encode image information is presented, wherein a first image comprises a lower dynamic range representation of the image information and a second image comprises a higher dynamic range representation of the image information, the encoding system comprising: a first layer encoder that is configured to encode the first image to generate a first layer bitstream and to reconstruct the first image to obtain a reconstructed first image, wherein the reconstructed first image is adapted to be stored in a first reference picture buffer; a context information generation module that is configured to generate context information for one or more pixels in the reconstructed first image, wherein context information associated with any particular pixel in the one or more pixels is based on at least one pixel neighboring the particular pixel; a curve fitting module that is configured to estimate an inverse mapping function from the generated context information and values of the one or more pixels in the reconstructed first image, the inverse mapping function being adapted to map a value from the lower dynamic range to the higher dynamic range; a computational module that is configured to apply the inverse mapping function to the one or more pixels of the reconstructed first image and, for each remaining pixel of the reconstructed first image, apply inverse mapping to the remaining pixel from the lower dynamic range to the higher dynamic range based on pixel value associated with the remaining pixel to generate an estimated second image, wherein the estimated second image is adapted to be stored in a second reference picture buffer; and a second layer encoder that is configured to encode the estimated second image to generate a second layer bitstream.

In an example embodiment of the disclosure, an inter-layer reference picture generation system that is configured to obtain an inter-layer reference picture based on image information is presented, wherein a first image comprises a lower dynamic range representation of the image information and a second image comprises a higher dynamic range representation of the image information, the inter-layer reference picture generation system comprising: an image partitioning module that is configured to partition the first and second images into one or more regions, a first set of pieces, and a second set of pieces; a context information generation module that is configured to, for any particular region among the one or more regions and any particular piece among the second set of pieces, generate context information for one or more pixels in the particular region and the particular piece, wherein the particular region and the particular piece are of the provided first image, wherein context information associated with any particular pixel in the particular region and the particular piece is based on at least one pixel neighboring the particular pixel; a curve fitting module that is configured to, for any particular region among the one or more regions and any particular piece among the second set of pieces, estimate a second inverse mapping function from the generated context information and values of the one or more pixels in the particular region and the particular piece, the second inverse mapping function being adapted to map a value from the lower dynamic range to the higher dynamic range; a selection module that is configured to, for any particular region among the one or more regions and any particular piece among the second set of pieces: compute a first estimated region and piece at the higher dynamic range by applying, via a first inverse mapping module, a first inverse mapping function to each pixel of the particular region and the particular piece, the first inverse mapping function being adapted to map a pixel value of the lower dynamic range to a pixel value of the higher dynamic range; compute a second estimated region and piece at the higher dynamic range by applying, via a second inverse mapping module, the second inverse mapping function to the one or more pixels of the particular region and the particular piece and applying, via the first inverse mapping module, the first inverse mapping function to the remaining pixels of the particular region and the particular piece; compute, via a computation module, a first cost metric and a second cost metric, wherein the first cost metric is based on a difference between the first estimated region and piece and corresponding region and piece in the second image and the second cost metric is based on a difference between the second estimated region and piece and corresponding region and piece in the second image; and select either the first inverse mapping function or the second inverse mapping function based on the first cost metric and the second cost metric; a region and piece generation module that is configured to generate a region and piece of the inter-layer reference picture by applying the selected inverse mapping function to the one or more pixels in the particular region and the particular piece of the first image and applying, via the first inverse mapping function, the first inverse mapping function to the remaining pixels of the particular region and the particular piece, wherein: the region and piece generation module is configured to generate a portion of the inter-layer reference picture, and the first inverse mapping module is configured to apply the first inverse mapping function to generate a remaining portion of the inter-layer reference picture to obtain the inter-layer reference picture, wherein the inter-layer reference picture is adapted to be stored in a reference picture buffer.

In an example embodiment of the disclosure, a decoding system that is configured to decode one or more bitstreams is presented, the one or more bitstreams comprising a first layer bitstream associated with lower dynamic range information and a second layer bitstream associated with higher dynamic range information, the decoding system comprising: a parsing module that is configured to extract from the one or more bitstreams first layer image information and one or more inverse mapping functions adapted to be applied to the first layer image information; a first layer reconstruction module that is configured to reconstruct a first layer image from the first layer image information, wherein the first layer image is associated with a lower dynamic range and is adapted to be stored in a reference picture buffer; and a second layer reconstruction module that is configured to generate a second layer image by applying the one or more inverse mapping functions to a plurality of pixels in the first layer image to decode the second layer bitstream, the plurality of pixels comprising at least one set of pixels, wherein each set of pixels is associated with one inverse mapping function among the one or more inverse mapping functions.

As used herein, the term "inverse mapping" may refer to mapping from a lower dynamic range to a higher dynamic range.

As used herein, the term "Standard Dynamic Range" (SDR) may refer to a dynamic range corresponding to current standard video systems (e.g., ITU-T Rec. 709, sRGB, and so forth).

As used herein, the term "Visual Dynamic Range" (VDR) may refer to a perceptual upper bound for distributed content conveying full color gamut and bounded instantaneous dynamic range.

As used herein, the terms "position", "pixel position", and "pixel location" are used interchangeably.

As used herein, the terms "region" and "partition" are used interchangeably and may refer to a pixel, a block of pixels (such as a macroblock or otherwise any defined coding unit), an entire picture or frame, a collection of pictures/frames (such as a sequence or subsequence). Macroblocks can comprise, by way of example and not of limitation, 4×4, 8×8, and 16×16 pixels within a picture. In general, a region can be of any shape and size.

An example method of segmenting a picture into regions, which can be of any shape and size, takes into consideration image characteristics. For example, a region within a picture can be a portion of the picture that contains similar image characteristics. Specifically, a region can be one or more pixels, macroblocks, or blocks within a picture that contains the same or similar chroma information, luma information, and so forth. The region can also be an entire picture. As an example, a single region can encompass an entire picture when the picture in its entirety is of one color or essentially one color.

As used herein, the term "piece" may refer to segments in a defined pixel value space or dynamic range space. For example, in 8 bit content, a pixel value can be between 0 and 255 (inclusive). The range [0, 255] can be separated into multiple segments.

As used herein, the term "bit depth" may refer to number of bits associated with a particular signal (e.g., an image or region thereof). Each pixel in a lower dynamic range representation of an image is generally associated with a lower bit depth than each pixel in a higher dynamic range representation of the image. However, it may also be possible for two signals with differing dynamic ranges to have the same bit-depth. By way of example and not of limitation, consider a case with 8 bits per pixel. A lower dynamic range may allow pixel values of range [25, 205] whereas a higher dynamic range may allow pixel values of range [0, 255]. The dynamic ranges are different, but the number of bits per pixel is the same in the above example.

As used herein, the term "higher priority layer" may refer to a layer that is coded prior to the coding of the present layer. Consequently, the higher priority layer is available to provide inter-layer information for inter-layer prediction of the present layer.

As used herein, the term "first layer" is defined herein to refer to any layer, such as a base layer or an enhancement layer, whereas the term "second layer" is defined herein to refer to any layer of lower priority than the first layer. The first layer can be a base layer while the second layer can be an enhancement layer. Alternatively, the first layer can be an enhancement layer while the second layer can be another enhancement layer of lower priority than the first layer.

As used herein, the terms "intra prediction" and "spatial prediction" are used interchangeably and may refer to utilizing already coded neighboring regions in the same video signal (e.g., picture, slice) to predict a current region of the video signal under consideration. Intra prediction may exploit spatial correlation and remove spatial redundancy inherent in the video signal. Spatial prediction may be performed on video regions of various sizes and shapes, although block based prediction is common. For example, H.264/AVC in its most common, consumer oriented profiles allows block sizes of 4×4, 8×8, and 16×16 pixels for spatial prediction of the luma component of the video signal and allows a block size of 8×8 pixels for the chroma components of the video signal.

As used herein, the terms "inter prediction" and "temporal prediction" are used interchangeably and may refer to utilizing video regions from neighboring video frames from reference pictures stored in a reference picture buffer to predict a current video region. Inter prediction may exploit temporal correlation and remove temporal redundancy inherent in the video signal. An example of inter prediction comprises motion prediction. Similar to intra prediction, temporal prediction also may be performed on video regions of various sizes and shapes. For example, for the luma component, H.264/AVC allows inter prediction block sizes such as 16×16, 16×8, 8×16, 8×8, 8×4, 4×8, and 4×4.

According to several embodiments of the disclosure, inverse mapping processes are provided that may be utilized in inter-layer prediction in a layered video codec, such as a bit depth scalable codec or a dynamic range scalable codec. Coding efficiency can be improved through such inter-layer prediction in, by way of example and not of limitation, a Scalable VDR (Visual Dynamic Range) codec 1.x (see references [5]-[6] and [18]-[19], incorporated by reference herein in their entireties) and 2.x (see reference [4], incorporated by reference herein in its entirety). It should be noted that the present disclosure discusses a H.264/AVC (see reference [1], incorporated by reference herein in its entirety) based VDR 2.x codec and assuming that the base layer is an 8 bit SDR signal and the enhancement layer is a 12 bit VDR signal. However, methods and systems discussed in the present disclosure can also be applied to other multi-layered codecs such as the VDR 1.x codec, dynamic range scalable codec, and bit-depth scalable codec (see references [7]-[17], incorporated by reference in their entireties). Other bit depths for the signals can also be utilized.

Figure 2:
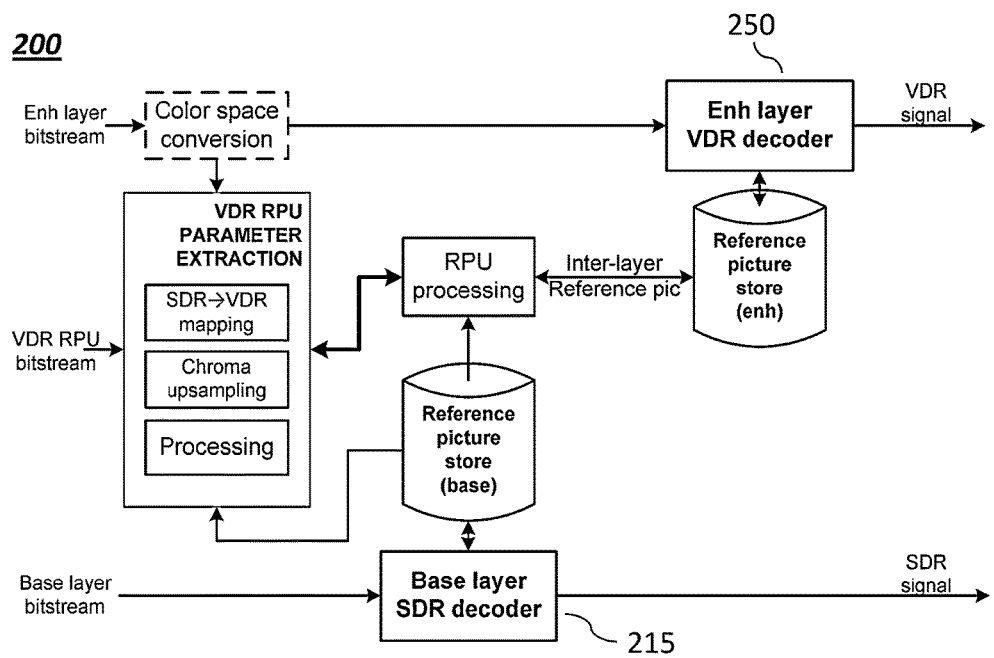
Figure 3:
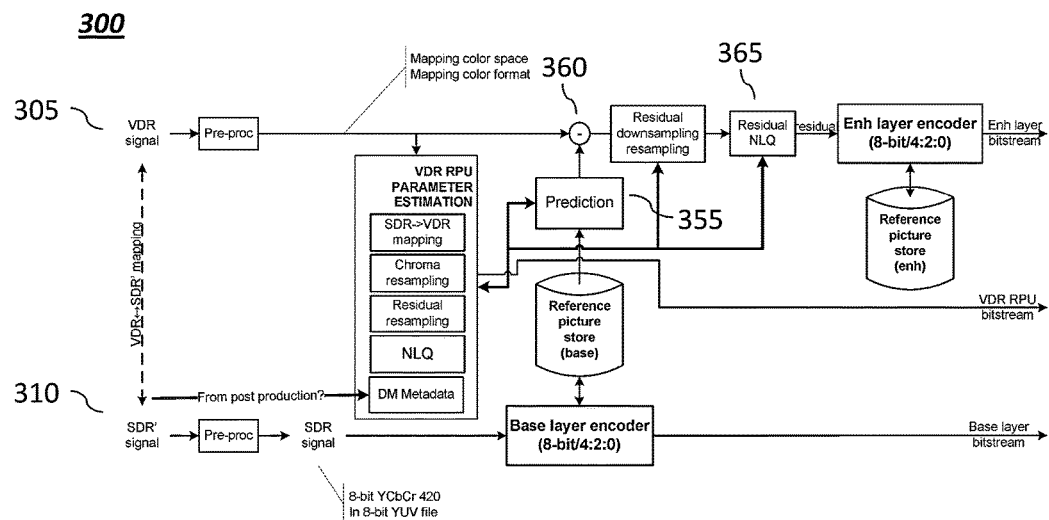
FIGS. 3 and 4 depict another example multi-layer encoding system and multi-layer decoding system, respectively.
Figure 4:
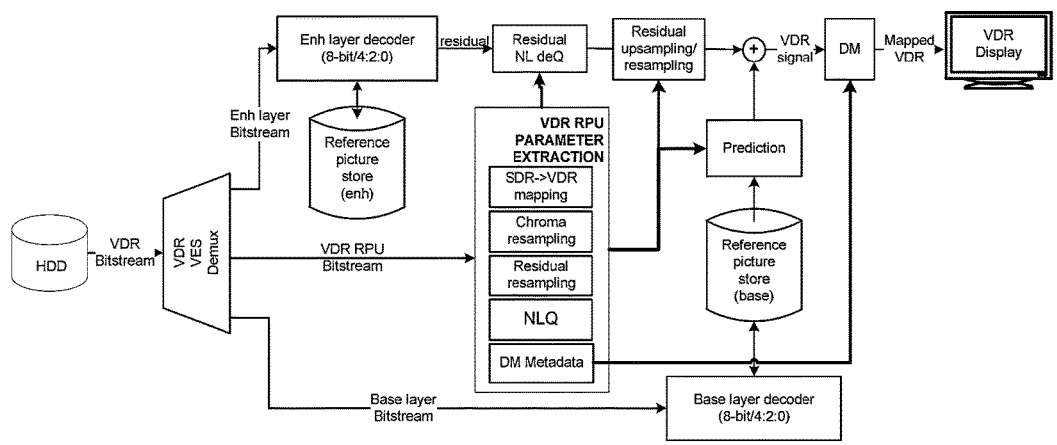

FIGS. 1 and 2 depict an example multi-layer encoding system (100) and multi-layer decoding system (200), respectively. Similarly, FIGS. 3 and 4 depict another example multi-layer encoding system and multi-layer decoding system, respectively. Each of FIGS. 1-4 depicts encoding/decoding systems comprising a base layer and an enhancement layer, where the base layer may contain image information having a lower dynamic range and the enhancement layer may contain image information having a higher dynamic range. Encoders (115 and 150 in FIG. 1) and decoders (215 and 250 in FIG. 2) associated with each of the layers can be encoders and decoders such as motion compensated prediction video encoders and decoders (MPEG-2, H.264, and so forth).

Specifically, FIGS. 1 and 2 depict a VDR 2.x codec (see reference [4]). An inter-layer reference picture (140) can be generated in a Reference Processing Unit (RPU) (135) to be used for prediction of an enhancement layer based on information from a base layer.

By way of example and not of limitation, a base layer can be a 4:2:0 8 bit SDR (Standard Dynamic Range) signal (110) and an enhancement layer can be a 4:4:4 12 bit VDR (Visual Dynamic Range) signal (105). Consider a case where the VDR signal (105) is forward mapped (112) to obtain the SDR signal (110) using the following process. The VDR 4:4:4 12 bit signal (105) can be mapped first to a 4:2:0 12 bit signal, which is then mapped to the SDR 4:2:0 8 bit signal (110). Separation of the inverse mapping into two steps may (but need not) reduce computational complexity.

The inverse mapping process can predict the 4:4:4 12 bit VDR signal (105) from the 4:2:0 8 bit SDR signal (110). A base layer encoder (115) can generate base layer reference pictures adapted to be stored in a base layer reference picture buffer (125). Chroma upsampling based on chroma upsampling parameters (132) can be performed to interpolate base layer information associated with the base layer reference pictures from 4:2:0 8 bits to 4:4:4 8 bits. An inverse mapping based on inverse mapping parameters (131) from SDR to VDR can then be performed to obtain an enhancement layer 4:4:4 12 bit signal from the base layer 4:4:4 8 bit signal. Alternatively, the inverse mapping can be performed in one step as well (e.g., straight from 4:2:0 8 bits to 4:4:4 12 bits). It should be noted that generally the inverse mapping process proceeds in a manner that parallels the associated forward mapping process. In such a case, the base layer encoder (115) can be an 8 bit encoder whereas the enhancement layer encoder (150) can be a 12 bit encoder.

It should be noted that an original input to the encoding system (100) can be, for instance, a VDR signal (105) captured by a camera, and this VDR signal (105) can be forward mapped (112) to an SDR signal (110) for compression and/or display purposes because many consumer devices are compatible with the SDR signal (110).

After the inverse mapping from a lower dynamic range to a higher dynamic range (SDR to VDR in the example above) has been performed, the obtained signal, comprising a plurality of newly generated pictures, can be stored in an enhancement layer reference picture buffer (145) and can be used by the enhancement layer encoder (150) for inter-layer prediction of the enhancement layer. The inverse mapping can be performed in the RPU (135).

With continued reference to FIG. 1, the encoding system (100) depicted in FIG. 1 is configured to receive video signals at a lower dynamic range (110) and a higher dynamic range (105). It should be noted that the lower dynamic range signal (110) can be inverse mapped (112) to generate the higher dynamic range signal (105) or, alternatively, the higher dynamic range signal (105) can be forward mapped (112) to obtain the lower dynamic range signal (110).

Prior to encoding of the higher dynamic range signal (105) by the enhancement layer encoder (150), a color space conversion (120), which is optional, may be performed by a color space conversion module (120) to convert the higher dynamic range signal (105) from one color space (e.g., an input color space) to another color space (e.g., an encoding color space). For example, the color space conversion (120) can convert from an XYZ/RGB color space associated with the higher dynamic range signal (105) to the YCbCr color space for encoding purposes. Losses may occur during the color space conversion (120) due to rounding operations. The encoding color space is generally selected for coding efficiency at the enhancement layer encoder (150), where the encoding color space can be associated with higher coding efficiency than the input color space.

The base layer encoder (115) is configured to encode and reconstruct the lower dynamic range signal (110) while the enhancement layer encoder (150) is configured to encode and reconstruct the higher dynamic range signal (105). Reconstructed base layer pictures can be stored in a base layer reference picture buffer (125). Base layer reference pictures can be utilized for prediction of base layer information and/or generation of an inter-layer reference picture (140), where the inter-layer reference picture (140) can be stored in an enhancement layer reference picture buffer (145) and can be used for prediction (e.g., motion estimation/compensation) of the enhancement layer.

Base layer reference pictures from the base layer reference picture buffer (125) can be processed using an RPU (135). The RPU (135) processes the base layer reference pictures based on parameters estimated by an RPU parameter estimation module (130). The RPU parameter estimation module (130) can estimate, by way of example and not of limitation, inverse mapping parameters (131), chroma upsampling parameters (132), and various other processing parameters (133) such as deblocking or decontouring parameters.

The RPU parameter estimation module (130) can be configured to estimate such parameters based on the base layer reference pictures and an original (or optionally color space converted) enhancement layer signal. For instance, the RPU parameter estimation module (130) can be configured to apply different possible parameters (131, 132, 133) to a base layer reference picture to predict an enhancement layer picture. A selection of parameters (131, 132, 133) can be made by computing one or more costs (e.g., distortion cost, rate-distortion cost, and so forth) based on a difference between the predicted enhancement layer picture and the original (or optionally color space converted) enhancement layer signal. Generally, a set of parameters (131, 132, 133) associated with a lowest cost is selected. The RPU parameter estimation module (130) can also be configured to encode and signal these parameters to a decoding system such as the decoding system (200) depicted in FIG. 2.

As previously stated, it should be noted that although the terms "standard dynamic range" and "visual dynamic range" are utilized, the terms may refer to any lower dynamic range signal and higher dynamic range signal, respectively. Additionally, the lower dynamic range signal may be, but need not be, 8 bits while the higher dynamic range signal may be, but need not be, 12 bits.

By way of example and not of limitation, in FIG. 3, the enhancement layer encoder can be an 8 bit encoder similar to the 8 bit base layer encoder. For instance, FIG. 3 depicts an encoding system (300) that comprises a base layer associated with SDR signals (310) and an enhancement layer associated with VDR signals (305). The VDR signals (305) can have higher bit depth (e.g., 10 bits or 12 bits) than the SDR signals (310). A higher bit depth signal can be predicted (355) based on reconstructed SDR signals of the base layer, and a residual can be computed (360) between the predicted higher bit depth signal and a corresponding VDR signal from the original (or optionally pre-processed) VDR signals (305). The residual can then be quantized (365) to convert from the higher bit depth to an 8 bit residual to be encoded by the 8 bit enhancement layer encoder. The inverse mapping methods can be the same for both FIG. 1 and FIG. 3.

Figure 5:
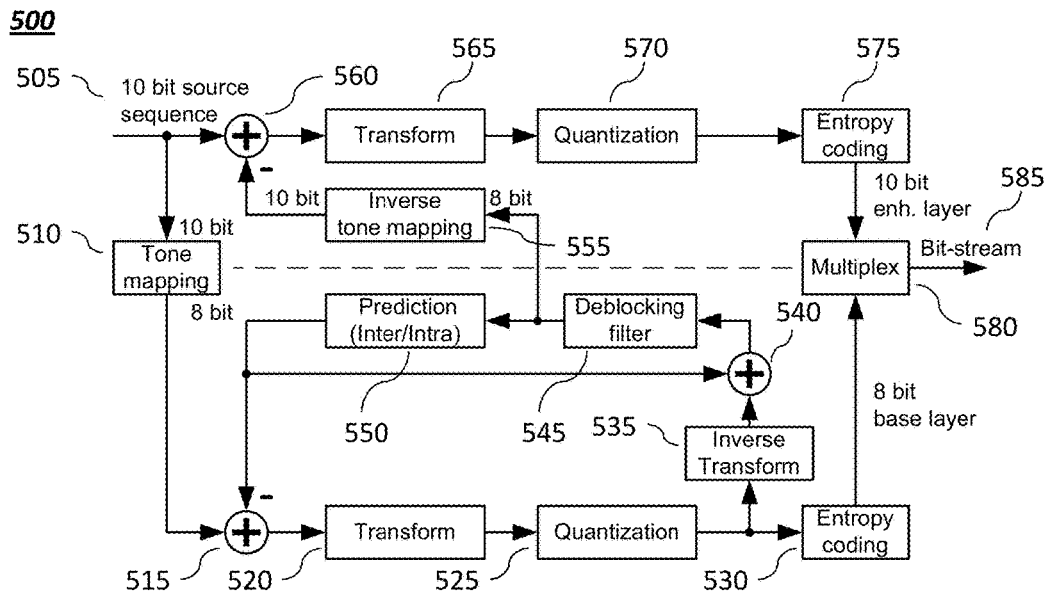
FIG. 5 depicts an example bit depth scalable encoding system.

FIG. 5 depicts an example bit depth scalable encoding system (500) that comprises a base layer and an enhancement layer. Specifically, the example bit depth scalable encoding system (500) provides a base layer associated with 8 bit image information and an enhancement layer associated with 10 bit image information.

An input to the bit depth scalable encoding system (500) may comprise a 10 bit source sequence (505). The 10 bit source sequence (505) can be forward mapped (510) to an 8 bit sequence representative of the base layer. At the base layer, images in the 8 bit sequence can be subtracted (515) via a arithmetic operation module (515) from corresponding inter or intra predicted base layer images from an inter/intra prediction module (550) to generate base layer residual information. The base layer residual information may then be transformed (520) and quantized (525) to generate base layer quantized transform residual information, which can be entropy coded (530) to generate an 8 bit base layer bitstream.

The base layer quantized transform residuals can also be inverse transformed and quantized (535) and then added, via an arithmetic operation module (530), to the predicted base layer images to generate reconstructed base layer images. The reconstructed base layer images can be optionally deblocked (545) by applying a deblocking filter (545) to the reconstructed base layer images. Deblocking (545) may be performed to remove artifacts (e.g., block artifacts) in the reconstructed base layer images due to region-based operations (e.g., block-based operations) generally performed on the base layer sequence.

The reconstructed (and optionally deblocked) base layer images, which in the example above comprise 8 bit image information, can be inverse mapped (555) to generate predicted 10 bit enhancement layer images. The predicted enhancement layer images can be subtracted (560) from the original 10 bit source sequence (505), via an arithmetic operation module (560), to generate enhancement layer residual information. The enhancement layer residual information can be transformed (565) and quantized (570) to generate quantized transform enhancement layer residual information, which can be entropy coded (575) to generate a 10 bit enhancement layer bitstream.

The 8 bit base layer bitstream and the 10 bit enhancement layer bitstream can be sent to a decoding system as separate bitstreams or as a single bitstream (585). The single bitstream (585) can be obtained from multiplexing (580), via a multiplexer (580), the base and enhancement layer bitstreams to generate the single bitstream (585). It should be noted that the bitstream or bitstreams can also signal to a decoding system processing parameters associated with each layer such as transformation parameters utilized by transformation modules (520, 565), quantization parameters utilized by quantization modules (525, 570), and prediction parameters utilized by inter and/or intra prediction module (550). A decoding system may be configured to decode the bitstream or bitstreams from the encoding system (500) based on information (e.g., processing parameters) signaled by the encoding system (500).

Although each of the encoding and decoding systems depicted previously comprises one base layer and one enhancement layer, additional base layers and/or enhancement layers can be implemented. For instance, a dynamic range scalable codec may comprise a base layer associated with image information having a first dynamic range, a first enhancement layer associated with image information having a second dynamic range, and a second enhancement layer associated with image information having a third dynamic range (and possibly more base layers and/or enhancement layers), where the second and third dynamic ranges can be of higher dynamic range than the first dynamic range. As another example, a bit depth scalable codec may comprise a base layer associated with image information at, for instance, 8 bits per pixel and at least a first and a second enhancement layer associated with image information at, for instance, 10 bits per pixel. The embodiments of the present disclosure can also be utilized in various other scalable codecs.

Figure 6:
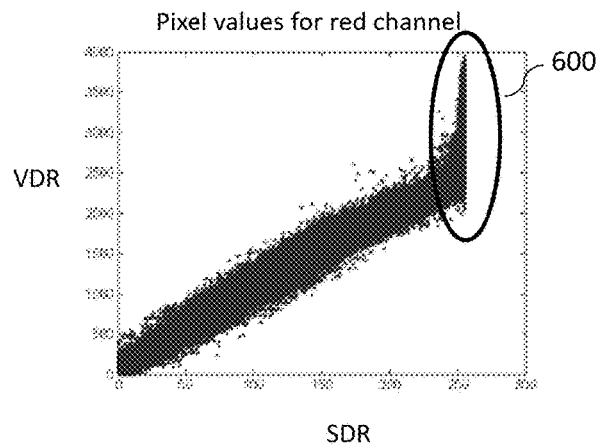
FIG. 6 depicts a mapping plot between values of a lower dynamic range and values of a higher dynamic range.

Many methods have been proposed for inverse mapping, such as polynomial mapping including linear mapping, table lookup, multivariate multiple regression (MMR), slope offset power (SOP) (see references [3] and [13], incorporated by reference herein in its entirety), and so forth. FIG. 6 depicts a mapping plot between SDR values and VDR values. With reference to the previous example, the SDR values are represented by 8 bits and thus can contain values between 0 and 255 whereas the VDR values are represented by 12 bits and thus can contain values between 0 and 4095. For instance, each pixel of a picture can contain information for red (R), green (G), and blue (B) color channels. Each color channel of any pixel in an SDR signal can contain a value between 0 and 255 whereas each color channel of any pixel in a VDR signal can contain a value between 0 and 4095.

A VDR signal has a higher dynamic range than an SDR signal. Because of this, a particular SDR value can potentially map to any one of a plurality of potential VDR values. As depicted in the mapping plot of a red channel in FIG. 6, it may be difficult to map data in some data range, for example, a dark or a bright range (600), where the mapping plot can be almost a vertical line, indicating that the SDR may be saturated within that range. For example, an SDR value of 255 may potentially map to a VDR value of 3000, 3200, 4000, or some other VDR value indicating high brightness.

In an embodiment of the disclosure, an inverse mapping method is described, where the inverse mapping method can consider neighboring pixel information as context information to distinguish in an SDR signal those pixels whose SDR values are close, but whose corresponding VDR values may vary widely (referred to as a saturated case). Traditional direct mapping generally utilizes a global mapping method. Context-based inverse mapping can be a local mapping method.

There are different methods which can be used to build context information for a current pixel under consideration for use in inverse mapping of a lower dynamic range signal (e.g., an SDR signal) to a higher dynamic range signal (e.g., a VDR signal). For instance, the context information can be based on spatial neighboring pixels directly, where spatial neighbors are generally those within a set range of pixels of the current pixel. Statistics characteristics of neighboring pixels such as averages, variances, gradients, and multi-channel information can also be utilized to build the context information. With reference to FIG. 1, context information may be generated in a parameter estimation module (130) that comprises a context information generation module. Inverse mapping parameters (131) estimated by the parameter estimation module (130) may comprise and/or may be a function of the generated context information.

In some embodiments of the present disclosure, inverse mapping parameters generated by inverse mapping with consideration of context information can be performed at an encoder side, and the generated inverse mapping parameters can be provided explicitly or implicitly to a decoder. For explicit mode, the encoder signals the inverse mapping parameters directly to the decoder. For implicit mode, the decoder may derive mapping parameters using previous decoded picture or pictures indicated by the encoder.

By way of example and not of limitation, in the saturated case, a current SDR pixel of pixel value 220 may map to VDR pixel values of, for instance, either 4000 or 4020. Without any context, the encoder/decoder may not be able to determine an appropriate mapping from among the possible VDR pixel values. By considering information from neighboring pixels of the current SDR pixel, the encoder/decoder may be better able to determine which of a plurality of mappings (e.g., 4000 and 4020 in the example above) to select for the VDR pixel value.

For example, an average value of a block of 3×3 spatial neighboring pixels of the current SDR pixel can be utilized as a context value to discern which mapped value to use. Other sized and shaped windows as well as other context information can also be utilized. A smaller context value may result in mapping to 4000 while a larger context value may result in mapping to 4020 even though the SDR value for both cases is 220 in this case.

In mapping methods that do not consider any context information, the inverse mapping can be described by Equation (1):

$$y(i,j)=imf(x(i,j)), \text{ where } x(i,j)\in[0,255] \text{ and } y(i,j)\in[0, 4095] \qquad (1)$$

where i represents a row index and j represents a column index of a picture. In Equation 1, x(i, j) represents the pixel value of an SDR signal, y(i, j) represents a mapped pixel value of a VDR signal, and $imf$ represents an inverse mapping function which is only associated with a pixel value.

In an embodiment of the disclosure, an inverse mapping function is represented by Equation (2), where $f$ represents an inverse mapping function that is a function of not only the pixel value of a current pixel under consideration but also context associated with the current pixel. Equation (2) is given as follows:

$$y(i,j)=f(g(x(i,j),\Omega(i,j))) \qquad (2)$$

where i represents a row index, j represents a column index, g represents a function associating x(i, j) with its context $\Omega(i, j)$, and the context $\Omega(i, j)$ comprises neighboring information associated with pixel location (i, j). The context can be used to differentiate pixels with identical x values. The context can be any statistical information of neighboring data such as mean, variance, and so forth as well as texture or edge indicators. By way of example and not of limitation, one method of using texture is to consider some or all pixel values within a small neighboring window as a vector. By way of further example and not of limitation, another method of using texture is to use a covariance matrix of a gradient within one neighboring window. The neighboring information can be associated with one or more pixels neighboring the current pixel (i, j). By way of example and not of limitation, neighboring information can refer to spatial neighbors, temporal neighbors, and/or pixel values of neighboring pixels from a different channel (e.g., different color channels). In one embodiment, a range of x can be expanded by using spatial neighbor information as indicated in Equation (3):

$$z = g(x(i,j), \Omega(i,j)), \text{ where } z \in [0, 2^M - 1], M \in [8, 12] \quad (3)$$

where g can be any function that generates a pixel z(i, j) of higher bit depth than a pixel x(i, j) based on context information $\Omega$ derived from one or more 8 bit neighbors of the pixel x(i, j). It should be noted that the value of z(i, j) is at the higher dynamic range (e.g., VDR).

The function g can be a polynomial, a spline function, or any other curve fitting function and can be a 2D separable or non-separable interpolation filter or an adaptive interpolation filter/function to interpolate pixels. An adaptive interpolation function may refer to an interpolation function whose interpolation filter (e.g., a Wiener filter) is not fixed and is instead adaptive to pixel statistics of a current pixel position. Edge information can be considered in performing the inverse mapping from x(i, j) to z(i, j).

In one embodiment, a linear function, as shown in Equation (4), can be used to generate a pixel z(i, j) of higher bit depth than pixel x(i, j) based on context information $\Omega$ derived from one or more 8 bit neighbors of the pixel x(i, j) within a (2S+1)×(2T+1) window (where S and T are integers greater than or equal to 0) centered at (i, j):

$$z = g(x(i,j), \Omega(i,j)) = \sum_{p=0, q=0}^{p=2S+1, q=2T+1} a(p, q) x(i + p - S, j + q - T) \quad (4)$$

where $$\sum_{p=0, q=0}^{p=2S+1, q=2T+1} a(p, q) = 2^{M-8}$$

and a(p, q) can be derived by least square method such as Wiener filter coefficient derivation as exemplified by the following formula:

$$\hat{a}(p, q) = \underset{a(p,q)}{\operatorname{argmin}} \left( \sum_{i,j} (y(i, j) - z(i, j))^2 \right).$$

Consider that an intermediate process generates a pixel value of 220.25. When performing quantization from 12 bits to 8 bits, the pixel value of 220.25 may be rounded to an integer value 220. A more precise inverse mapping can be obtained if information can be provided to determine what pixel value was rounded to obtain 220. In Equation (3), 220.25 translates to the integer representation with more bits to represent the value because of multiplication by the factor a(p, q).

The encoding process can proceed as follows. For each pixel x(i, j), Equation (3) can be used to generate z(i, j), then the inverse mapping function $f$, mapping from z(i, j) to y(i, j), can be estimated after statistics for the whole picture or for all regions in the picture on which inverse mapping of the present disclosure is to be performed have been computed. The data y'(i, j)=$f$(z(i, j)) for each pixel can be predicted and a reference picture in the RPU can be generated for enhancement layer coding, where y' denotes an estimated VDR value in contrast to a pixel value from an original VDR signal denoted as y. For the decoding process, syntax of the RPU header file can first be parsed to yield the inverse mapping function $f$ utilized by the encoding process. For each pixel (i, j), z(i, j) can be computed and the data y'(i, j)=$f$(z(i, j)) can be predicted. The reference picture can be generated in the RPU for enhancement layer decoding.

In another embodiment, it may be possible to compute an inverse mapping conditioned on spatial neighbor information, as shown in Equation (5) below:

$$y(i,j) = f(g(x(i,j), \Omega(i,j))) = f(x(i,j), h(x(p,q)_{|\Omega})) = f(x(i,j), z(i,j)) \quad (5)$$

where (p, q) represents a neighboring position of (i, j), i.e., (p,q)∈$\Omega$(i, j), and h represents a function of the spatial neighbor information of x(i, j). The function h can be any linear or nonlinear function. Whereas g(x) in Equation (3) represents an expansion to higher bit depth, z(i, j)=h(x(i, j)) in Equation (5) can be any linear or nonlinear function of the spatial neighbor information that yields a value with the same bit depth as x(i, j) and can be regarded as a context condition for x(i, j). Specifically, even if a plurality of x(i, j) values is the same for an SDR signal, mapped values y(i, j) can be distinguished by context information associated with pixels x(i, j).

By way of example and not of limitation, $\Omega$ can be defined to be a (2S+1)×(2T+1) window (where S and T are integers greater than or equal to 0) centered at (i, j) and h can represent an average or weighted average of neighboring pixels in SI In one example, when the SDR value 220 of a current pixel is inverse mapped, first a mean (z(i, j) in Equation (5)) of the current pixel's 3×3 window (when S=T=1) is measured. It can be assumed that $f$(220, 210) and $f$(220, 230) should result in different inverse mapping values, so that a more precise mapping may be obtained.

The encoding process can be as follows. For each pixel x(i, j), Equation (5) is used to generate z(i, j), then an inverse mapping function $f$ can be estimated after statistics for the whole picture or for an entire region have been computed. A set of data y'=$f$(x, z) for each pixel can then be predicted and a reference picture can be generated in an RPU for enhancement layer coding. For a decoding process, syntax of an RPU data header is first parsed to determine the inverse mapping function $f$ that was utilized in the encoding process. Then, for each pixel, z can be computed and the data y'=$f$(x, z) can be predicted. The reference picture can be generated in the RPU for enhancement layer decoding.

Once Equation (2) is defined, any inverse mapping function can be used. By way of example, and not of limitation, such a function may comprise polynomial mapping (including linear mapping), table lookup, MMR, SOP (see reference [13]), and so forth. It is possible to adapt the inverse mapping function to fit from either a perspective of efficiency or complexity. In addition, methods and systems of the disclosure can be combined with piecewise mapping. For example, inverse mapping can be applied only to a certain range of an SDR signal for which estimating a mapping function can be difficult, such as brightest or darkest ranges as depicted in FIG. 6. In the following, an example which uses context-based inverse mapping only for the brightest range will be described.

After Equation (3) is used to compute a value for z, z can be inverse mapped using traditional mapping methods without context (e.g., polynomial mapping, MMR, and SOP). But for the case of utilizing table lookup to map from z to y, since the SDR data range is expanded from 255 to $2^M$−1, size of a lookup table may increase when inverse mapping is performed.

To reduce overhead of the lookup table, it is possible to update the lookup table on a sequence, scene or GOP (group of pictures). Alternatively or in conjunction with updating the lookup table, piecewise linear interpolation can be used to approximate the lookup table. The lookup table can be coded in absolute value or differentially spatially and temporally.

For instance, instead of coding a lookup table with specific values, a difference can be computed between values of a first lookup table, associated with one region of a frame, and values of a second lookup table, associated with another region of a frame (either the same frame or a different frame). The computed difference can be coded instead of the specific values associated with either or both of the first and second lookup tables.

Values in a lookup table can be adapted/tuned based on the characteristics of the data for a current region, slice, picture, scene, and GOP. For example, it is possible to generate a new table using data for a current region, slice, picture, scene, or GOP and only send a difference of the new table and a previous table. In some cases, only those elements of a lookup table that have changed by a value larger than a certain threshold are updated. It is also possible to update the lookup table gradually by only updating necessary parts. These necessary parts may refer to elements of the lookup table whose distortion cost is greater than a certain amount, where distortion cost can be calculated according to the following equation:

$$J=D+\lambda *R$$

In the above equation, J may refer to the total cost, D may refer to the distortion by sending R bits, λ may refer to a weight, and R may refer to number of bits allocated for updating the LUT (lookup table).

For Equation (5), as previously described, input can be multivariable. For instance, if h is defined as a weighted average of the rectangle window, which is a scalar, Equation (5) depends on two variables: x and h. As another example, h can also be defined as a gradient of x within a neighboring window (2 dimensional vector), texture information consisting of a 3×3 neighboring window (8 dimensional vector value), or a gradient covariance matrix (2×2 matrix).

In one example, direct mapping $y(i, j)=ax(i, j)+b$ can be performed to map from a lower dynamic range signal (e.g., picture) $x(i, j)$ to a higher dynamic range signal $y(i, j)$. According to several embodiments of the present disclosure, an inverse mapping can be written as $y(i, j)=ax(i, j)+cz(i, j)+b$, where $x(i, j)$ and $z(i, j)$ are two input variables and $z(i, j)$ can be a function of context information associated with pixel $x(i, j)$. For table lookup, the same strategy as for Equation (3) can be used. In addition, if we only want to use it for the brightest range, we can constrain the value of the input variable z to be within certain range too as the input variable x. By way of example and not of limitation, the inverse mapping with context information $y(i, j)=ax(i, j)+cz(i, j)+b$ could be performed only on pixels×(i, j) within a certain range of values, whereas pixels outside of the range can follow the inverse mapping provided by $y(i, j)=ax(i, j)+b$.

Methods and systems of the present disclosure can be added as one or more additional modes in an inverse mapping process. Different inverse mapping methods can be combined with methods and systems of the present disclosure (for example, selectively choosing between y=ax+b and y=ax+cz+b), or use methods and systems of the present disclosure with different approaches such as Equation (3) and Equation (5) to form a generally more robust inverse mapping prediction for an inter-layer reference picture.

Methods and systems of the present disclosure can be extended by not only considering the neighboring information of a pixel's own color component but also considering cross channel neighboring information as well. In the former, inverse mapping associated with a current pixel can take into consideration, for instance, a red channel value of the current pixel as well as red channel values of a neighboring pixel or pixels. In the latter, inverse mapping associated with the current pixel can take into consideration, for instance, a green channel value of a current pixel and a red channel value of the current pixel itself or neighboring pixel or pixels.

Context can also be extended to edge information such as gradients instead of only considering pixel values. Alternatively, context can be based on a high dimensional vector such as a vector formed by 3×3 neighboring pixels. In a context based inverse mapping method according to several embodiments of the present disclosure, the context can be a clue to derive the mapping functions, and it can be a selective combination of one or more of all above contexts. Pixels associated with the same pixel value in a lower dynamic range representation may be mapped to different pixel values in a higher dynamic range representation based on the context.

An example of RPU syntax is depicted in Table 1 and Table 2.

TABLE 1

RPU Header Syntax

| rpu_data_header( ) { | C | Descriptor |
|---|---|---|
| ... | | |
| num_x_partitions_minus1 | 0 | ue(v) |
| num_y_partitions_minus1 | 0 | ue(v) |
| neighboring_mapping_idc | 0 | ue(v) |
| ... | 0 | |
| } | | |

TABLE 2

RPU Data Payload: VDR RPU Data Mapping Process

| rpu_data_mapping( y, x ) { | C | Descriptor |
|---|---|---|
| // mapping method and mapping parameters | | |
| separate_component_mapping_flag[ y ][ x ] | 0 | u(1) |
| if ( separate_component_mapping_flag ) | | |
| num_cmps = 3 | | |
| else | | |
| num_cmps = 1 | | |
| for ( cmp = 0; cmp < num_cmps; cmp++ ) { | | |
| for ( pivot_idx = 0; pivot_idx < num_pivots_minus2[ cmp ] + 1; pivot_idx++ ) { | | |
| mapping_idc[ y ][ x ][ cmp ][ pivot_idx ] | 0 | ue(v) |
| use_neighboring_mapping_flag[ y ][ x ][ cmp ][ pivot_idx ] | 0 | u(1) |

TABLE 2-continued

RPU Data Payload: VDR RPU Data Mapping Process

| rpu_data_mapping( y, x ) { | C | Descriptor |
|---|---|---|
|     if ( num_mapping_param_predictors[ y ][ x ][ cmp ][ pivot_idx ] > 0 ) | | |
|       mapping_param_pred_flag[ y ][ x ][ cmp ][ pivot_idx ] | 0 | u(1) |
|     else | | |
|       mapping_param_pred_flag[ y ][ x ][ cmp ][ pivot_idx ] = 0 | | |
|     if( mapping_param_pred_flag[ y ][ x ][ cmp ][ pivot_idx ] = = 0 ) | | |
|       rpu_data_mapping_param (y, x, cmp, pivot_idx) | | |
|     else { | | |
|       if( num_mapping_param_predictors[ y ][ x ][ cmp ][ pivot_idx ] > 1 ) | | |
|         diff_pred_part_idx_mapping[ y ][ x ][ cmp ][ pivot_idx ] | 0 | ue(v) |
|     } | | |
|   } // pivot_idx | | |
| } // cmp | | |
| } | | |

In an RPU header, information is given which indicates which method should be used for using neighboring information to perform inverse mapping for a picture. In an RPU payload VDR RPU Data Mapping Process, a flag to indicate if inverse mapping with neighboring information can be used for that piece.

If the variable neighboring_mapping_idc is equal to 0, this specifies that a current frame uses inverse mapping with neighboring information as in Equation (3). If the variable neighboring_mapping_idc is equal to 1, this specifies that the current frame uses inverse mapping with neighboring information as in Equation (5). If the variable neighboring_mapping_idc is equal to 2, this specifies that the current frame uses inverse mapping with neighboring information combining Equation (3) and Equation (5).

If the variable use_neighboring_mapping_flag is equal to 1, this specifies that neighboring information can be used for mapping. If the variable use_neighboring_mapping_flag is equal to 0, this specifies that no neighboring information is used for mapping.

Figure 7:
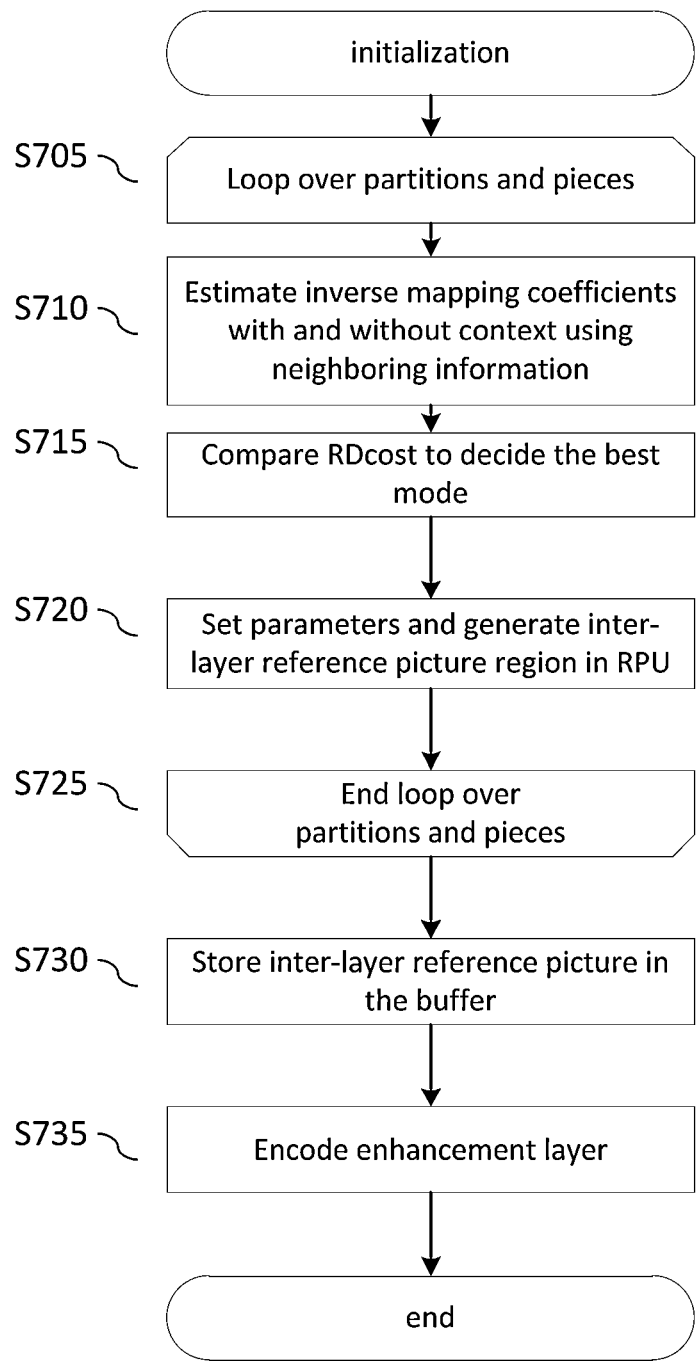
FIGS. 7 and 8 depict example flowcharts of encoding and decoding processes, respectively.
Figure 8:
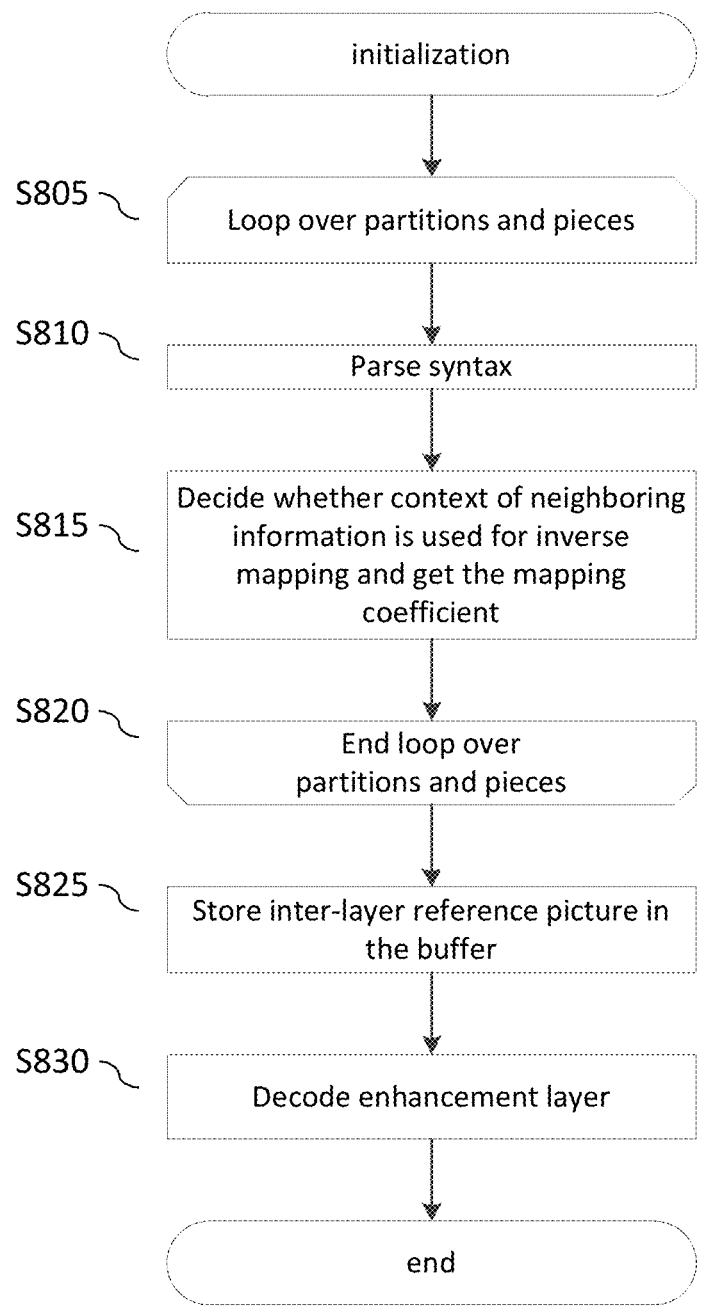

Examples of an encoder and a decoder flowchart are depicted in FIG. 7 and FIG. 8, respectively.

At the encoder side, as depicted in FIG. 7, an image can be separated into partitions (spatial regions within a picture) and pieces (segments within pixel value or dynamic range space), and the image can be provided in both a lower dynamic range representation (e.g., denoted as SDR) to a base layer and a higher dynamic range representation (e.g., denoted as VDR) to an enhancement layer. For each partition and piece of the image (S705), inverse mapping coefficients can be estimated (S710). A first set of inverse mapping coefficients can be estimated (S710) based on each pixel of the partition itself while a second set of inverse mapping coefficients can be estimated (S710) based on each pixel with consideration to context information associated with neighboring information of each pixel. By way of example and not of limitation, for linear mapping functions described above (e.g., y=ax+cz+b), the inverse mapping coefficients can comprise linear coefficients a, b, and c.

Each set of inverse mapping coefficients can be utilized to generate a first estimated and a second estimated higher dynamic range representation of the partition. The two estimated higher dynamic range representations can each be compared with (e.g., subtracted from) the provided VDR representation. A metric such as rate-distortion cost can be computed for each estimated higher dynamic range representation, and, a comparison (S715) can be performed between the computed metrics. In the case of rate-distortion cost, the estimated higher dynamic range representation associated with lower rate-distortion cost may be selected as the better mode and thus the mode utilized in the encoding process (and signaled to a decoding process). Distortion can be computed by utilizing a sum of squared error (SSE), sum of absolute difference (SAD), or sum of absolute transform difference (SATD).

Inverse mapping parameters can be set (S720) to the selected mode and inter-layer reference pictures can be generated based on applying the set inverse mapping parameters to base layer reference pictures.

Each of the steps (S710, S715, S720) can be performed for each partition or piece of the image (S725). The generated inter-layer reference pictures can be stored (S730) in a reference picture buffer and utilized as reference pictures for encoding (S735) of the enhancement layer.

At the decoder side, as depicted in FIG. 8, for each partition or piece of an image (S805), a decoder can parse syntax (S810) of a bitstream signaled from the encoder. The partition and inverse mapping parameters can be found in a VDR RPU bitstream (165 in FIG. 1). The syntax can signal (S815) to the decoder actual inverse mapping coefficients themselves and/or can signal a decision as to whether or not inverse mapping of a particular partition or piece utilizes context information and allow the decoder to generate the inverse mapping coefficients obtained at the encoder. Each of the steps (S810, S815) can be performed for each partition or piece of the image. Once steps (S810, S815) have been performed for each partition or piece of the image (S820), inverse mapping parameters can be utilized to generate inter-layer reference pictures, which can then be stored (S825) in a reference picture buffer and utilized as reference pictures for decoding (S830) of the enhancement layer.

The examples set forth above are provided to give those of ordinary skill in the art a complete disclosure and description of how to make and use the embodiments of the context based inverse mapping method for layered codec of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a", "an", and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The methods and systems described in the present disclosure may be implemented in hardware, software, firmware or combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable gate array (FPGA)).

As described herein, an embodiment of the present invention may thus relate to one or more of the example embodiments that are enumerated in Table 3, below. Nevertheless, it will be understood that various modifications can be made without departing from the spirit and scope of the present disclosure. Accordingly, other embodiments are within the scope of the following example embodiments or the listed claims.

TABLE 3

Enumerated Example Embodiments

| | |
|---|---|
| EEE1. | A method of generating a second pixel based on a first pixel, wherein a first image comprises the first pixel and a second image comprises the second pixel, the first image having a lower dynamic range and the second image having a higher dynamic range, the method comprising:<br>providing a value of the first pixel;<br>generating context information based on at least one pixel neighboring the first pixel; and<br>computing a value of the second pixel based on the value of the first pixel and the context information of the at least one pixel to generate the second pixel. |
| EEE2. | The method according to Enumerated Example Embodiment (EEE) 1, wherein the at least one pixel neighboring the first pixel comprises one or more of spatial neighbors and temporal neighbors of the first pixel. |
| EEE3. | The method according to any one of EEEs 1 or 2 wherein the generating of context information comprises providing values of the at least one pixel neighboring the first pixel. |
| EEE4. | The method according to EEE 3, further comprising:<br>generating statistical information based on the provided values of the at least one pixel neighboring the first pixel,<br>wherein:<br>the statistical information comprises at least one of mean of the provided values, variance of the provided values, texture associated with the provided values, and gradient associated with the provided values, and<br>the computing is based on the statistical information. |
| EEE5. | The method according to any one of EEEs 1-4, wherein the computing comprises:<br>estimating an inverse mapping function based on the value of the first pixel and the generated context information, the estimated inverse mapping function being adapted to map a value from the lower dynamic range to the higher dynamic range. |
| EEE6. | The method according to EEE 5, wherein the estimated inverse mapping function comprises at least one of a linear function, a polynomial function, a multivariate multiple regression function, a slope offset power function, and a spline function. |
| EEE7. | The method according to EEE 5, wherein the estimated inverse mapping function is performed using a lookup table. |
| EEE8. | The method according to EEE 7, wherein the lookup table is differentially coded. |
| EEE9. | The method according to any one of EEEs 5 or 6, wherein the estimated inverse mapping function is based on statistical information from each pixel of the first image. |
| EEE10. | The method according to any one of EEEs 1-9, wherein the computing is performed by at least one of a two-dimensional separable interpolation filter, a two-dimensional non-separable interpolation filter, and an adaptive interpolation filter. |
| EEE11. | The method according to any one of EEEs 1-10, wherein the generating of context information comprises performing one of:<br>computing a weighted average of the at least one pixel neighboring the first pixel;<br>computing a linear combination of the at least one pixel neighboring the first pixel;<br>computing a gradient of the at least one pixel neighboring the first pixel;<br>computing texture information based on the at least one pixel neighboring the first pixel; and<br>computing a gradient covariance matrix based on the at least one pixel neighboring the first pixel. |
| EEE12. | A method of generating a second image based on a first image by inverse mapping the first image, the first image comprising pixels with values of a lower dynamic range and the second image comprising pixels with values of a higher dynamic range, the method comprising:<br>providing the first image;<br>generating context information for one or more pixels in the first image, wherein context information associated with any particular pixel in the first image is based on at least one pixel neighboring the particular pixel;<br>estimating an inverse mapping function from the generated context information and values of the one or more pixels in the first image, the inverse mapping function being |

TABLE 3-continued

Enumerated Example Embodiments

| | |
|---|---|
| | adapted to map a value from the lower dynamic range to the higher dynamic range; and applying the inverse mapping function to the one or more pixels of the first image and, for each remaining pixel of the first image, inverse mapping the remaining pixel from the lower dynamic range to the higher dynamic range based on pixel value associated with the remaining pixel to generate the second image. |
| EEE13. | The method according to EEE 12, wherein the inverse mapping of the remaining pixels comprises at least one of polynomial mapping, linear mapping, table lookup, multivariate multiple regression, or slope offset power. |
| EEE14. | The method according to EEE 13, wherein the lookup table is differentially coded. |
| EEE15. | The method according to any one of EEEs 12-14, wherein the generating of context information comprises, for any particular pixel in the first image, providing values of at least one pixel neighboring the particular pixel. |
| EEE16. | The method according to EEE 15, further comprising: generating statistical information based on the provided values of the at least one pixel neighboring the particular pixel, wherein: the statistical information comprising at least one of mean of the provided values, variance of the provided values, texture associated with the provided values, and gradient associated with the provided values, and the estimating is based on the statistical information. |
| EEE17. | The method according to any one of EEEs 12-16, wherein the estimated inverse mapping function comprises at least one of a linear function, a polynomial function, a lookup table, a multivariate multiple regression function, a slope offset power function, and a spline function. |
| EEE18. | The method according to EEE 17, wherein the lookup table is differentially coded. |
| EEE19. | The method according to any one of EEEs 12-18, wherein the applying is performed by at least one of a two-dimensional separable interpolation filter, a two-dimensional non-separable interpolation filter, and an adaptive interpolation filter. |
| EEE20. | The method according to any one of EEEs 12-19, wherein the generating of context information comprises, for the particular pixel, one of: computing a weighted average of the at least one pixel neighboring the particular pixel; computing a linear combination of the at least one pixel neighboring the particular pixel; computing a gradient of the at least one pixel neighboring the particular pixel; computing texture information based on the at least one pixel neighboring the particular pixel; and computing a gradient covariance matrix based on the at least one pixel neighboring the particular pixel. |
| EEE21. | A method of encoding image information, the method comprising: providing a first image and a second image, the first image comprising a lower dynamic range representation of the image information and the second image comprising higher dynamic range representation of the image information; encoding the first image to generate a first layer bitstream; reconstructing the first image to obtain a reconstructed first image, wherein the reconstructed first image is adapted to be stored in a first reference picture buffer; generating context information for one or more pixels in the reconstructed first image, wherein context information associated with any particular pixel in the one or more pixels based on at least one pixel neighboring the particular pixel; estimating an inverse mapping function from the generated context information and values of the one or more pixels in the reconstructed first image, the inverse mapping function being adapted to map a value from the lower dynamic range to the higher dynamic range; computing an estimated second image based on applying the inverse mapping function to the one or more pixels of the reconstructed first image and, for each remaining pixel of the reconstructed first image, inverse mapping the remaining pixel from the lower dynamic range to the higher dynamic range based on pixel value associated with the remaining pixel to generate the estimated second image, wherein the estimated second image is adapted to be stored in a second reference picture buffer; and encoding the estimated second image to generate a second layer bitstream. |
| EEE22. | The method according to EEE 21, wherein the inverse mapping remaining pixels comprises at least one of polynomial mapping, linear mapping, table lookup, multivariate multiple regression, or slope offset power. |
| EEE23. | The method according to EEE 21, wherein the lookup table is differentially coded. |
| EEE24. | The method according to any one of EEEs 21 or 22, wherein the generating of context information comprises performing one of: computing a weighted average of the at least one pixel neighboring the particular pixel; computing a linear combination of the at least one pixel neighboring the particular pixel; computing a gradient of the at least one pixel neighboring the particular pixel; computing texture information based on the at least one pixel neighboring the particular pixel; and computing a gradient covariance matrix based on the at least one pixel neighboring the particular pixel. |
| EEE25. | The method according to any one of EEEs 21 or 22, wherein: the generating of context information comprises performing, for any particular pixel in the one or more pixels of the reconstructed first image, at least one of: |

TABLE 3-continued

Enumerated Example Embodiments

|  |  |
| --- | --- |
|  | (i) computing a weighted average of the at least one pixel neighboring the particular pixel to generate a first set of context information; <br> (ii) computing a linear combination of the at least one pixel neighboring the particular pixel to generate a second set of context information; <br> (iii) computing a gradient of the at least one pixel neighboring the particular pixel to generate a third set of context information; <br> (iv) computing texture information based on the at least one pixel neighboring the particular pixel to generate a fourth set of context information; and <br> (v) computing a gradient covariance matrix based on the at least one pixel neighboring the particular pixel to generate a fifth set of context information; and <br> the estimating of the inverse mapping function comprises: <br> estimating a corresponding inverse mapping function for each generated set of context information from among the generated sets of context information; and <br> selecting the inverse mapping function corresponding to one set of context information from among the generated sets of context information, based on a metric. |
| EEE26. | The method according to EEE 25, wherein the estimating of the inverse mapping function comprises: <br> for each generated set of context information: <br> estimating an inverse mapping function from the generated set of context information and values of the one or more pixels in the reconstructed first image, the estimated inverse mapping function being adapted to map a value from the lower dynamic range to the higher dynamic range; <br> computing an estimated second image based on applying the inverse mapping function to the one or more pixels of the reconstructed first image and, for each remaining pixel of the reconstructed first image, inverse mapping the remaining pixel from the lower dynamic range to the higher dynamic range based on pixel value associated with the remaining pixel to generate the estimated second image, wherein the estimated second image is adapted to be stored in a second reference picture buffer; and <br> computing a metric based on a difference between the estimated second image and the provided second image; and <br> selecting the estimated inverse mapping function associated with the generated set of context information corresponding to the lowest computed metric. |
| EEE27. | The method according to EEE 26, wherein the inverse mapping function comprises at least one of polynomial mapping, linear mapping, table lookup, multivariate multiple regression, or slope offset power. |
| EEE28. | The method according to EEE 27, wherein the lookup table is differentially coded. |
| EEE29. | The method according to any one of EEEs 26-28, wherein the computing of the metric comprises: <br> computing a distortion metric as the computed metric, <br> wherein the distortion metric is a function of the difference between the estimated second image and the provided second image and a number of bits used to signal mode of the generating of the context information. |
| EEE30. | The method according to any one of EEEs 21-29, further comprising, prior to encoding the estimated second image: <br> subtracting the estimated second image from the provided second image to obtain a residual, <br> wherein the encoding comprises encoding the residual. |
| EEE31. | The method according to EEE 30, further comprising resampling and/or quantizing the residual prior to encoding the residual. |
| EEE32. | The method according to any one of EEEs 21-31, further comprising signaling the estimated inverse mapping function. |
| EEE33. | The method according to EEE 32, wherein the signaling comprises generating a header file comprising information associated with the estimated inverse mapping function. |
| EEE34. | A method of obtaining an inter-layer reference picture based on image information, the method comprising: <br> providing a first image and a second image, the first image comprising a lower dynamic range representation of the image information and associated with a first layer and the second image comprising a higher dynamic range representation of the image information and associated with a second layer; <br> providing a first inverse mapping function, the first inverse mapping function being adapted to map a pixel value of the lower dynamic range to a pixel value of the higher dynamic range; <br> partitioning the first and second images into one or more regions, a first set of pieces, and a second set of pieces; <br> for any particular region among the one or more regions and any particular piece among the second set of pieces: <br> (i) generating context information for one or more pixels in the particular region and the particular piece, wherein the particular region and the particular piece are of the provided first image, wherein context information associated with any particular pixel in the particular region and the particular piece is based on at least one pixel neighboring the particular pixel; <br> (ii) estimating a second inverse mapping function from the generated context information and values of the one or more pixels in the particular region and the particular piece, the second inverse mapping function being adapted to map a value from the lower dynamic range to the higher dynamic range; |

TABLE 3-continued

Enumerated Example Embodiments

|  |  |
|---|---|
|  | (iii) computing a first estimated region and piece at the higher dynamic range based on applying the first inverse mapping function to each pixel of the particular region and the particular piece;<br>(iv) computing a second estimated region and piece at the higher dynamic range based on applying the second inverse mapping function to the one or more pixels of the particular region and the particular piece and applying the first inverse mapping function to the remaining pixels of the particular region and the particular piece;<br>(v) computing a first metric based on a difference between the first estimated region and piece and corresponding region and piece in the provided second image;<br>(vi) computing a second metric based on a difference between the second estimated region and piece and corresponding region and piece in the provided second image;<br>(vii) selecting either the first inverse mapping function or the second inverse mapping function based on the first metric and the second metric; and<br>(viii) generating a region and piece of the inter-layer reference picture by applying the selected inverse mapping function to the one or more pixels in the particular region and the particular piece of the provided first image and applying the first inverse mapping function to the remaining pixels of the particular region and the particular piece;<br>performing (i) through (viii) for each region and each piece in the one or more regions and one or more pieces of the first and second images to generate a portion of the inter-layer reference picture; and<br>for any particular region among the one or more regions and any particular piece among the first set of pieces:<br>applying the first inverse mapping function to generate a remaining portion of the inter-layer reference picture to obtain the inter-layer reference picture, wherein the inter-layer reference picture is adapted to be stored in a reference picture buffer. |
| EEE35. | The method according to EEE 34, wherein:<br>the generating of context information for the particular region and the particular piece comprises performing at least one of:<br>(i) computing a weighted average of the at least one pixel neighboring the particular pixel to generate a first set of context information;<br>(ii) computing a gradient of the at least one pixel neighboring the particular pixel to generate a second set of context information;<br>(iii) computing texture information based on the at least one pixel neighboring the particular pixel to generate a third set of context information;<br>(iv) computing a gradient covariance matrix based on the at least one pixel neighboring the particular pixel to generate a fourth set of context information; and<br>(v) computing a linear combination of the at least one pixel neighboring the particular pixel to generate a fifth set of context information; and<br>the estimating of the second inverse mapping function comprises:<br>estimating a corresponding inverse mapping function for each generated set of context information from among the generated sets of context information; and<br>selecting the inverse mapping function corresponding to one set of context information from among the generated sets of context information, based on a metric. |
| EEE36. | The method according to EEE 35, wherein the estimating of the inverse mapping function comprises:<br>for each generated set of context information:<br>estimating an inverse mapping function from the generated set of context information and values of the one or more pixels in the particular region and the particular piece, the estimated inverse mapping function being adapted to map a value from the lower dynamic range to the higher dynamic range;<br>computing an estimated region and piece corresponding to the provided second image based on applying the estimated inverse mapping function to the one or more pixels of the particular region and the particular piece of the provided first image and, for each remaining pixel of the particular region and the particular piece of the provided first image, applying the first inverse mapping function to the remaining pixel to map the remaining pixel from the lower dynamic range to the higher dynamic range based on pixel value associated with the remaining pixel to generate the estimated particular region and the particular piece corresponding to the provided second image; and<br>computing a metric based on a difference between the estimated particular region and the particular piece corresponding to the provided second image and the particular region and the particular piece corresponding to the provided second image; and<br>selecting as the second inverse mapping function the estimated inverse mapping function associated with the generated set of context information corresponding to the lowest computed metric. |
| EEE37. | The method according to EEE 36, wherein the inverse mapping function comprises at least one of polynomial mapping, linear mapping, table lookup, multivariate multiple regression, or slope offset power. |
| EEE38. | The method according to EEE 37, wherein the lookup table is differentially coded |
| EEE39. | The method according to any one of EEEs 36-38, wherein the computing of the metric comprises:<br>computing a distortion metric as the computed metric,<br>wherein the distortion metric is a function of the difference between_the estimated particular region and the particular piece corresponding to the provided second image and the |

TABLE 3-continued

Enumerated Example Embodiments

|  |  |
|---|---|
|  | particular region and the particular piece corresponding to the provided second image and a number of bits used to signal mode of the generating of the context information. |
| EEE40. | The method according to any one of EEEs 34-39, wherein the first and second metrics are rate-distortion costs. |
| EEE41. | A method for encoding image information, comprising: performing the method according to any one of EEEs 34 or 40 to generate an inter-layer reference picture; and encoding the second layer to generate a bitstream, wherein the encoding is based on the generated inter-layer reference picture. |
| EEE42. | The method according to any one of EEEs 34-41, wherein the first inverse mapping function comprises at least one of polynomial mapping, linear mapping, table lookup, multivariate multiple regression, or slope offset power. |
| EEE43. | The method according to EEE 42, wherein the lookup table is differentially coded. |
| EEE44. | A method for decoding one or more bitstreams, the one or more bitstreams comprising a first layer bitstream associated with lower dynamic range information and a second layer bitstream associated with higher dynamic range information, the method comprising: extracting from the one or more bitstreams first layer image information and one or more inverse mapping functions adapted to be applied to the first layer image information; reconstructing a first layer image from the first layer image information, wherein the first layer image is associated with a lower dynamic range and is adapted to be stored in a reference picture buffer; and generating a second layer image by applying the one or more inverse mapping functions to a plurality of pixels in the first layer image to decode the second layer bitstream, the plurality of pixels comprising at least one set of pixels, wherein each set of pixels is associated with one inverse mapping function among the one or more inverse mapping functions. |
| EEE45. | A method for decoding one or more bitstreams, the one or more bitstreams comprising a first layer bitstream associated with lower dynamic range information and a second layer bitstream associated with higher dynamic range information, the method comprising: providing the one or more bitstreams, wherein the one or more bitstreams comprise image information encoded by performing the method according to any one of EEEs 41-43; extracting from the one or more bitstreams first layer image information and one or more inverse mapping functions adapted to be applied to the first layer image information; reconstructing a first layer image from the first layer image information, wherein the first layer image is associated with a lower dynamic range and is adapted to be stored in a reference picture buffer; and generating a second layer image by applying the one or more inverse mapping functions to a plurality of pixels in the first layer image to decode the second layer bitstream, the plurality of pixels comprising at least one set of pixels, wherein each set of pixels is associated with one inverse mapping function among the one or more inverse mapping functions. |
| EEE46. | The method according to any one of EEEs 44 or 45, wherein an inverse mapping function adapted to be performed on a particular set of pixels among the at least one set of pixels is signaled from an encoding method. |
| EEE47. | The method according to any one of EEEs 44-46, wherein information associated with the inverse mapping function is from a header file or high level syntax signaled from an encoding method. |
| EEE48. | A system that is configured to generate a second pixel based on a first pixel, wherein a first image comprises the first pixel and a second image comprises the second pixel, the first image having a lower dynamic range and the second image having a higher dynamic range, the system comprising: a context information generation module that is configured to generate context information based on at least one pixel neighboring the first pixel; and a computation module that is configured to receive the context information from the context information generation module and compute a value of the second pixel based on a value of the first pixel and the context information of the at least one pixel to generate the second pixel. |
| EEE49. | The system according to EEE 48, wherein the at least one pixel neighboring the first pixel comprises one or more of spatial neighbors and temporal neighbors of the first pixel. |
| EEE50. | The system according to any one of EEEs 48 or 49, wherein the context information generation module is configured to generate the context information based on values associated with the at least one pixel neighboring the first pixel. |
| EEE51. | The system according to EEE 50, wherein: the context information generation module is further configured to generate statistical information based on the values associated with the at least one pixel neighboring the first pixel, the computation module is configured to compute the value of the second pixel based on the statistical information, and the statistical information comprises at least one of mean of, variance of, textures associated with, and gradients associated with the values associated with the at least one pixel neighboring the first pixel. |

TABLE 3-continued

Enumerated Example Embodiments

EEE52. The system according to any one of EEEs 48-51, wherein the computation module is configured to estimate an inverse mapping function based on the value of the first pixel and the generated context information, the estimated inverse mapping function being adapted to map a value from the lower dynamic range to the higher dynamic range.

EEE53. The system according to EEE 51, wherein the estimated inverse mapping function comprises at least one of a linear function, a polynomial function, and a spline function.

EEE54. The system according to any one of EEEs 52 or 53, wherein the estimated inverse mapping function is based on statistical information from each pixel of the first image.

EEE55. The system according to any one of EEEs 48-54, wherein the computation module comprises at least one of a two-dimensional separable interpolation filter, a two-dimensional non-separable interpolation filter, and an adaptive interpolation filter.

EEE56. The system according to any one of EEEs 48-55, wherein the context information generation module is configured to perform one of:
computing a weighted average of the at least one pixel neighboring the first pixel;
computing a linear combination of the at least one pixel neighboring the first pixel;
computing a gradient of the at least one pixel neighboring the first pixel;
computing texture information based on the at least one pixel neighboring the first pixel; and
computing a gradient covariance matrix based on the at least one pixel neighboring the first pixel.

EEE57. A system that is configured to generate a second image based on a first image by inverse mapping the first image, the first image comprising pixels with values of a lower dynamic range and the second image comprising pixels with values of a higher dynamic range, the system comprising:
a context information generation module that is configured to generate context information for one or more pixels in the first image, wherein context information associated with any particular pixel in the first image is based on at least one pixel neighboring the particular pixel;
a curve fitting module that is configured to estimate an inverse mapping function from the generated context information and values of the one or more pixels in the first image, the inverse mapping function being adapted to map a value from the lower dynamic range to the higher dynamic range; and
a computational module that is configured to apply the inverse mapping function to the one or more pixels of the first image and, for each remaining pixel of the first image, apply inverse mapping to the remaining pixel from the lower dynamic range to the higher dynamic range based on pixel value associated with the remaining pixel to generate the second image.

EEE58. The system according to EEE 57, wherein the inverse mapping of the remaining pixels comprises at least one of polynomial mapping, linear mapping, table lookup, multivariate multiple regression, or slope offset power.

EEE59. The system according to any one of EEEs 57 or 58, wherein the context information generation module is configured to generate the context information based on values associated with the at least one pixel neighboring the particular pixel.

EEE60. The system according to EEE 59, wherein:
the context information generation module is further configured to generate statistical information based on the values associated with the at least one pixel neighboring the particular pixel,
the curve fitting module is configured to estimate the inverse mapping function based on the statistical information, and
the statistical information comprises at least one of mean of, variance of, textures associated with, and gradients associated with the values associated with the at least one pixel neighboring the particular pixel.

EEE61. The system according to any one of EEEs 57-60, wherein the estimated inverse mapping function comprises at least one of a linear function, a polynomial function, and a spline function.

EEE62. The system according to any one of EEEs 57-61, wherein the computation module comprises at least one of a two-dimensional separable interpolation filter, a two-dimensional non-separable interpolation filter, and an adaptive interpolation filter.

EEE63. The system according to any one of EEEs 57-62, wherein the context information generation module is configured to perform one of:
computing a weighted average of the at least one pixel neighboring the particular pixel;
computing a linear combination of the at least one pixel neighboring the particular pixel;
computing a gradient of the at least one pixel neighboring the particular pixel;
computing texture information based on the at least one pixel neighboring the particular pixel; and
computing a gradient covariance matrix based on the at least one pixel neighboring the particular pixel.

EEE64. An encoding system that is configured to encode image information, wherein a first image comprises a lower dynamic range representation of the image information and a second image comprises a higher dynamic range representation of the image information, the encoding system comprising:
a first layer encoder that is configured to encode the first image to generate a first layer bitstream and to reconstruct the first image to obtain a reconstructed first image, wherein the reconstructed first image is adapted to be stored in a first reference picture buffer;
a context information generation module that is configured to generate context information for one or more pixels in the reconstructed first image, wherein context information associated with any particular pixel in the one or more pixels is based on at least one pixel neighboring the particular pixel;

TABLE 3-continued

Enumerated Example Embodiments

|  | |
|---|---|
| | a curve fitting module that is configured to estimate an inverse mapping function from the generated context information and values of the one or more pixels in the reconstructed first image, the inverse mapping function being adapted to map a value from the lower dynamic range to the higher dynamic range; <br> a computational module that is configured to apply the inverse mapping function to the one or more pixels of the reconstructed first image and, for each remaining pixel of the reconstructed first image, apply inverse mapping to the remaining pixel from the lower dynamic range to the higher dynamic range based on pixel value associated with the remaining pixel to generate an estimated second image, wherein the estimated second image is adapted to be stored in a second reference picture buffer; and <br> a second layer encoder that is configured to encode the estimated second image to generate a second layer bitstream. |
| EEE65. | The encoding system according to EEE 64, wherein the inverse mapping of the remaining pixels comprises at least one of polynomial mapping, linear mapping, table lookup, multivariate multiple regression, or slope offset power. |
| EEE66. | The encoding system according to any one of EEEs 64 or 65, wherein the context information generation module is configured to perform one of: <br> computing a weighted average of the at least one pixel neighboring the particular pixel; <br> computing a linear combination of the at least one pixel neighboring the particular pixel; <br> computing a gradient of the at least one pixel neighboring the particular pixel; <br> computing texture information based on the at least one pixel neighboring the particular pixel; and <br> computing a gradient covariance matrix based on the at least one pixel neighboring the particular pixel. |
| EEE67. | The encoding system according to any one of EEEs 64 or 65, wherein: <br> the context information generation module is configured to perform at least one of: <br> (i) computing a weighted average of the at least one pixel neighboring the particular pixel to generate a first set of context information; <br> (ii) computing a linear combination of the at least one pixel neighboring the particular pixel to generate a second set of context information <br> (iii) computing a gradient of the at least one pixel neighboring the particular pixel to generate a third set of context information; <br> (iv) computing texture information based on the at least one pixel neighboring the particular pixel to generate a fourth set of context information; and <br> (v) computing a gradient covariance matrix based on the at least one pixel neighboring the particular pixel to generate a fifth set of context information; and <br> the curve fitting module is configured to: <br> estimate a corresponding inverse mapping function for each generated set of context information from among the generated sets of context information; and <br> select the inverse mapping function corresponding to one set of context information from among the generated sets of context information, based on a metric. |
| EEE68. | The encoding system according to EEE 67, wherein the curve fitting module is configured to estimate and select the inverse mapping function by: <br> for each generated set of context information: <br> (i) estimating an inverse mapping function from the generated set of context information and values of the one or more pixels in the reconstructed first image, the estimated inverse mapping function being adapted to map a value from the lower dynamic range to the higher dynamic range; <br> (ii) computing an estimated second image based on applying the inverse mapping function to the one or more pixels of the reconstructed first image and, for each remaining pixel of the reconstructed first image, inverse mapping the remaining pixel from the lower dynamic range to the higher dynamic range based on pixel value associated with the remaining pixel to generate the estimated second image, wherein the estimated second image is adapted to be stored in a second reference picture buffer; and <br> (iii) computing a metric based on a difference between the estimated second image and the provided second image; and <br> selecting the estimated inverse mapping function associated with the generated set of context information corresponding to the lowest computed metric. |
| EEE69. | The encoding system according to EEE 68, wherein the computing of the metric comprises: <br> computing a distortion metric as the computed metric, <br> wherein the distortion metric is a function of the difference between the estimated second image and the provided second image and a number of bits used to signal mode of the generating of the context information. |
| EEE70. | The encoding system according to any one of EEEs 64-69, further comprising: <br> an arithmetic operation module that is configured to subtract the estimated second image from the provided second image to obtain a residual, <br> wherein the second layer encoder is configured to encode the residual. |
| EEE71. | The encoding system according to EEE 70, further comprising: <br> a residual processing module that is configured to resample and/or quantize the residual to generate a processed residual, <br> wherein the second layer encoder is configured to encode the processed residual. |
| EEE72. | The encoding system according to any one of EEEs 64-71, wherein the encoding system is configured to signal the estimated inverse mapping function to a decoding system. |
| EEE73. | The encoding system according to EEE 72, wherein the encoding system is configured to signal the estimated inverse mapping function to a decoding system by |

TABLE 3-continued

Enumerated Example Embodiments generating a header file comprising information associated with the estimated inverse mapping function.

EEE74. An inter-layer reference picture generation system that is configured to obtain an inter-layer reference picture based on image information, wherein a first image comprises a lower dynamic range representation of the image information and a second image comprises a higher dynamic range representation of the image information, the inter-layer reference picture generation system comprising:
an image partitioning module that is configured to partition the first and second images into one or more regions, a first set of pieces, and a second set of pieces;
a context information generation module that is configured to, for any particular region among the one or more regions and any particular piece among the second set of pieces, generate context information for one or more pixels in the particular region and the particular piece, wherein the particular region and the particular piece are of the provided first image, wherein context information associated with any particular pixel in the particular region and the particular piece is based on at least one pixel neighboring the particular pixel;
a curve fitting module that is configured to, for any particular region among the one or more regions and any particular piece among the second set of pieces, estimate a second inverse mapping function from the generated context information and values of the one or more pixels in the particular region and the particular piece, the second inverse mapping function being adapted to map a value from the lower dynamic range to the higher dynamic range;
a selection module that is configured to, for any particular region among the one or more regions and any particular piece among the second set of pieces:
compute a first estimated region and piece at the higher dynamic range by applying, via a first inverse mapping module, a first inverse mapping function to each pixel of the particular region and the particular piece, the first inverse mapping function being adapted to map a pixel value of the lower dynamic range to a pixel value of the higher dynamic range;
compute a second estimated region and piece at the higher dynamic range by applying, via a second inverse mapping module, the second inverse mapping function to the one or more pixels of the particular region and the particular piece and applying, via the first inverse mapping module, the first inverse mapping function to the remaining pixels of the particular region and the particular piece;
compute, via a computation module, a first cost metric and a second cost metric, wherein the first cost metric is based on a difference between the first estimated region and piece and corresponding region and piece in the second image and the second cost metric is based on a difference between the second estimated region and piece and corresponding region and piece in the second image; and
select either the first inverse mapping function or the second inverse mapping function based on the first cost metric and the second cost metric;
a region and piece generation module that is configured to generate a region and piece of the inter-layer reference picture by applying the selected inverse mapping function to the one or more pixels in the particular region and the particular piece of the first image and applying, via the first inverse mapping module, the first inverse mapping function to the remaining pixels of the particular region and the particular piece,
wherein:
the region and piece generation module is configured to generate a portion of the inter-layer reference picture, and
the first inverse mapping module is configured to apply the first inverse mapping function to generate a remaining portion of the inter-layer reference picture to obtain the inter-layer reference picture, wherein the inter-layer reference picture is adapted to be stored in a reference picture buffer.

EEE75. The inter-layer reference picture generation system according to EEE 75, wherein:
the context information generation module is configured to perform at least one of:
(i) computing a weighted average of the at least one pixel neighboring the particular pixel to generate a first set of context information;
(ii) computing a linear combination of the at least one pixel neighboring the particular pixel to generate a second set of context information
(iii) computing a gradient of the at least one pixel neighboring the second pixel to generate a third set of context information;
(iv) computing texture information based on the at least one pixel neighboring the particular pixel to generate a fourth set of context information; and
(v) computing a gradient covariance matrix based on the at least one pixel neighboring the particular pixel to generate a fifth set of context information;
and
the curve fitting module is configured to:
estimate a corresponding inverse mapping function for each generated set of context information from among the generated sets of context information; and
select the inverse mapping function corresponding to one set of context information from among the generated sets of context information, based on a metric.

EEE76. The inter-layer reference picture generation system according to EEE 75, wherein the curve fitting module is configured to estimate and select the second inverse mapping function by:
for each generated set of context information:
(i) estimating an inverse mapping function from the generated set of context information and values of the one or more pixels in the particular region and the particular piece, the estimated inverse mapping function being adapted to map a value from the lower dynamic range to the higher dynamic range;

TABLE 3-continued

Enumerated Example Embodiments (ii) computing an estimated region and piece corresponding to the second image based on applying the estimated inverse mapping function to the one or more pixels of the particular region and the particular piece of the first image and, for each remaining pixel of the particular region and the particular piece of the first image, applying, via the first inverse mapping module, the first inverse mapping function to the remaining pixel to map the remaining pixel from the lower dynamic range to the higher dynamic range based on pixel value associated with the remaining pixel to generate the estimated particular region and the particular piece corresponding to the provided second image; and
(iii) computing a metric based on a difference between the estimated particular region and the particular piece corresponding to the provided second image and the particular region and the particular piece corresponding to the provided second image; and
selecting as the second inverse mapping function the estimated inverse mapping function associated with the generated set of context information corresponding to the lowest computed metric.

EEE77. The inter-layer reference picture generation system according to EEE 76, wherein the computing of the metric comprises:
computing a distortion metric as the computed metric,
wherein the distortion metric is a function of the difference between the estimated particular region and the particular piece corresponding to the second image and the particular region and the particular piece corresponding to the second image and a number of bits used to signal mode of the generating of the context information.

EEE78. The inter-layer reference picture generation system according to any one of EEEs 74-77, wherein the first and second cost metrics are rate-distortion costs.

EEE79. An encoding system that is configured to encode image information, comprising:
an inter-layer reference picture generation system according to any one of EEEs 74-78 that is configured to generate an inter-layer reference picture; and
a second layer encoder that is configured to generate a bitstream based on the generated inter-layer reference picture.

EEE80. The system according to any one of EEEs 74-79, wherein the first inverse mapping function comprises at least one of polynomial mapping, linear mapping, table lookup, multivariate multiple regression, or slope offset power.

EEE81. A decoding system that is configured to decode one or more bitstreams, the one or more bitstreams comprising a first layer bitstream associated with lower dynamic range information and a second layer bitstream associated with higher dynamic range information, the decoding system comprising:
a parsing module that is configured to extract from the one or more bitstreams first layer image information and one or more inverse mapping functions adapted to be applied to the first layer image information;
a first layer reconstruction module that is configured to reconstruct a first layer image from the first layer image information, wherein the first layer image is associated with a lower dynamic range and is adapted to be stored in a reference picture buffer; and
a second layer reconstruction module that is configured to generate a second layer image by applying the one or more inverse mapping functions to a plurality of pixels in the first layer image to decode the second layer bitstream, the plurality of pixels comprising at least one set of pixels, wherein each set of pixels is associated with one inverse mapping function among the one or more inverse mapping functions.

EEE82. A decoding system that is configured to decode one or more bitstreams, the one or more bitstreams comprising a first layer bitstream associated with lower dynamic range information and a second layer bitstream associated with higher dynamic range information, the decoding system comprising:
a parsing module that is configured to extract from the one or more bitstreams first layer image information and one or more inverse mapping functions adapted to be applied to the first layer image information;
a first layer reconstruction module that is configured to reconstruct a first layer image from the first layer image information, wherein the first layer image is associated with a lower dynamic range and is adapted to be stored in a reference picture buffer; and
a second layer reconstruction module that is configured to generate a second layer image by applying the one or more inverse mapping functions to a plurality of pixels in the first layer image to decode the second layer bitstream, the plurality of pixels comprising at least one set of pixels, wherein each set of pixels is associated with one inverse mapping function among the one or more inverse mapping functions,
wherein the one or more bitstreams comprises image information encoded by encoding system according to EEE 79.

EEE83. The decoding system according to any one of EEEs 81 or 82, wherein inverse mapping function adapted to be performed on a particular set of pixels among the at least one set of pixels is signaled from an encoding system.

EEE84. The decoding system according to any one of EEEs 81-83, wherein information associated with the inverse mapping function is from a header file or high level syntax signaled from an encoding system.

EEE85. A system that is configured to generate a second set of pixels from a first set of pixels by performing the method according to any one of EEEs 1-20, wherein pixels in the first set of pixels have a lower dynamic range and pixels in the second set of pixels have a higher dynamic range.

EEE86. An inter-layer reference picture generation system that is configured to generate an inter-layer reference picture by performing the method according to any one of EEEs 34-40.

TABLE 3-continued

Enumerated Example Embodiments

EEE87. An encoding system for encoding image information according to the method recited in any one of EEEs 21-33 and 41-43.
EEE88. A decoding system for decoding one or more bitstreams according to the method recited in any one of EEEs 44-47.
EEE89. A system that is configured to perform the method according to any one of EEEs 1-47.
EEE90. A computer-readable medium containing a set of instructions that causes a computer to perform the method recited in one or more of EEEs 1-47.

LIST OF REFERENCES

[1] Advanced video coding for generic audiovisual services, itu.int/rec/recommendation.asp?type=folders&lang=e&parent=T-REC-H.264, retrieved Dec. 21, 2011
[2] JVT reference software, iphome.hhi.de/suchring/tml/download/JM18.2.zip, retrieved Jan. 4, 2012.
[3] S. Qu, P. Yin, Y. Ye, Y. He, W. Gish, G.-M. Su, Y. Yuan, and S. Hulyalkar, "Specifying Visual Dynamic Range Coding Operations And Parameters", U.S. Provisional Application No. 61/582,614, filed on Jan. 3, 2012.
[4] Alexandros Tourapis, "Scalable Video Coding for Bit-depth and Color Format", Provisional U.S. Patent Application No. 61/451,536, filed on Mar. 10, 2011.
[5] W. Gish, R. Webb, Z. Li, and A. Tourapis, "Compatible compression of high dynamic range, visual dynamic range, and wide color gamut video", Provisional U.S. Patent Application No. 61/159,954, filed Mar. 13, 2009.
[6] W. Gish, Z. Li, D. Pian, C. Vogt, H. Kim, and D. Ruhoff, "Extending image dynamic range," International Application No. PCT/US2011/048861, filed on Aug. 23, 2011.
[7] Y. Gao, A. Segall, and T. Wiegand, "AHG Report: SVC bit depth and chroma format", Joint Video Team, Doc. JVT-W010, San Jose, Calif., April 2007.
[8] Y. Gao and Y. Wu, "CE4: SVC bit-depth scalability simulation results", Joint Video Team, Doc JVT-W102, San Jose, Calif., April 2007.
[9] A. Segall and Y. Su, "System for bit-depth scalable coding", Joint Video Team, Doc. JVT-W113, San Jose, Calif., April 2007.
[10] A. Segall, "CE4: Verif JVT-W102 (Thomson prop)", Joint Video Team, Doc. JVT-W116, San Jose, Calif., April 2007.
[11] Y. Gao and Y. Wu, "Simulation Results for CE2: SVC Bit-depth Scalability", Joint Video Team, JVT-X051, Geneva, Switzerland, June 2007.
[12] Y. Wu and Y. Gao, "Study on Inter-layer Prediction in Bit-Depth Scalability", Joint Video Team, JVT-X052, Geneva, Switzerland, June 2007.
[13] M. Winken, H. Schwarz, D. Marpe, and T. Wiegand, "CE2: SVC bit-depth scalability", Joint Video Team, JVT-X057, Geneva, Switzerland, June 2007.
[14] A. Segall and Y. Su, "CE2: Inter-layer Prediction for Bit-Depth Scalable Coding", Joint Video Team, JVT-X067, Geneva, Switzerland, June 2007.
[15] S. Liu, A. Vetro and W.-S. Kim, "Inter-layer Prediction for SVC Bit-Depth Scalable Coding", Joint Video Team, JVT-X075, Geneva, Switzerland, June 2007.
[16] Y. Ye, H. Chung, M. Karczewicz, and I. S. Chong, "Improvements to Bit Depth Scalability Coding", Joint Video Team, JVT-Y048, Shenzhen, China, October 2007.
[17] A. Segall, "CE1: Bit-Depth Scalability", Joint Video Team, JVT-X301r1, Geneva, Switzerland, June 2007
[18] W. Gish, R. Webb, Z. Li, and A. Tourapis, "Layered Compression of High Dynamic Range, Visual Dynamic Range, and Wide Color Gamut Video", International Application No. PCT/US2010/026953, filed Mar. 11, 2010.
[19] W. Gish, Z. Li, and C. Vogt, "Compatible Compression Of High Dynamic Range, Visual Dynamic Range, and Wide Color Gamut Video", U.S. application Ser. No. 13/091,311, filed Apr. 21, 2011.

The invention claimed is:

1. A method of generating a second pixel based on a first pixel by an inverse mapping function, wherein a first image comprises the first pixel and a second image comprises the second pixel, the first image having a lower dynamic range and the second image having a higher dynamic range, the method comprising:
providing the first pixel;
providing a value of the first pixel;
generating context information based on at least one pixel neighboring the first pixel; and
computing a value of the second pixel based on the value of the first pixel and the context information of the at least one pixel to generate the second pixel;
generating statistical information based on the provided values of the at least one pixel neighboring the first pixel,
wherein:
the statistical information comprises at least one of mean of the provided values, variance of the provided values, texture associated with the provided values, and gradient associated with the provided values,
the computing is based on the statistical information,
the at least one pixel neighboring the first pixel comprises neighboring pixels on a different channel than the first pixel,
the generating of context information comprises reading values of the at least one pixel neighboring the first pixel, and
the computing comprises estimating an inverse mapping function based on the value of the first pixel and the generated context information, the estimated inverse mapping function being adapted to map a value from the lower dynamic range to the higher dynamic range; and
applying the inverse mapping function to the first pixel to generate the second pixel.

2. The method according to claim 1, wherein the estimated inverse mapping function comprises at least one of a linear function, a polynomial function, a multivariate multiple regression function, a slope offset power function, and a spline function.

3. The method according to claim 1, wherein the estimated inverse mapping function is performed using a lookup table.

4. The method according to claim 3, wherein the lookup table is differentially coded.

5. The method according to claim 1, wherein the estimated inverse mapping function is based on statistical information from each pixel of the first image.

6. The method according to claim 1, wherein the computing is performed by at least one of a two-dimensional separable interpolation filter, a two-dimensional non-separable interpolation filter, and an adaptive interpolation filter.

7. The method according to claim 1, wherein the generating of context information comprises performing one of:
 computing a weighted average of the at least one pixel neighboring the first pixel;
 computing a linear combination of the at least one pixel neighboring the first pixel;
 computing a gradient of the at least one pixel neighboring the first pixel;
 computing texture information based on the at least one pixel neighboring the first pixel; and
 computing a gradient covariance matrix based on the at least one pixel neighboring the first pixel.

8. The method according to claim 1, wherein the at least one pixel neighboring the first pixel is from a different color channel than the color channel of the first pixel.

9. A method of generating a second image based on a first image by inverse mapping the first image, the first image comprising pixels with values of a lower dynamic range and the second image comprising pixels with values of a higher dynamic range, the method comprising:
 providing the first image;
 generating context information for one or more pixels in the first image, wherein context information associated with a first pixel of the one or more pixels in the first image is based on at least one pixel neighboring the first pixel;
 estimating an inverse mapping function from the generated context information and values of the one or more pixels in the first image, the inverse mapping function being adapted to map a value from the lower dynamic range to the higher dynamic range; and
 applying the inverse mapping function to the one or more pixels of the first image and, for each remaining pixel of the first image, inverse mapping the remaining pixel from the lower dynamic range to the higher dynamic range based on pixel value associated with the remaining pixel to generate the second image;
 generating statistical information based on the provided values of the at least one pixel neighboring the first pixel,
 wherein:
 the statistical information comprising at least one of mean of the provided values, variance of the provided values, texture associated with the provided values, and gradient associated with the provided values,
 the estimating is based on the statistical information,
 the at least one pixel neighboring the first pixel comprises neighboring pixels on a different channel than the first pixel, and
 the generating of context information comprises reading values of the at least one pixel neighboring the first pixel.

10. The method according to claim 9, wherein the inverse mapping of the remaining pixels comprises at least one of polynomial mapping, linear mapping, table lookup, multivariate multiple regression, or slope offset power.

11. The method according to claim 10, wherein the lookup table is differentially coded.

12. The method according to claim 9, wherein the estimated inverse mapping function comprises at least one of a linear function, a polynomial function, a lookup table, a multivariate multiple regression function, a slope offset power function, and a spline function.

13. The method according to claim 12, wherein the lookup table is differentially coded.

14. The method according to claim 9, wherein the applying is performed by at least one of a two-dimensional separable interpolation filter, a two-dimensional non-separable interpolation filter, and an adaptive interpolation filter.

15. The method according to claim 9, wherein the generating of context information comprises, for the first pixel, one of:
 computing a weighted average of the at least one pixel neighboring the first pixel;
 computing a linear combination of the at least one pixel neighboring the first pixel;
 computing a gradient of the at least one pixel neighboring the first pixel;
 computing texture information based on the at least one pixel neighboring the first pixel; and
 computing a gradient covariance matrix based on the at least one pixel neighboring the first pixel.

16. The method according to claim 9, wherein the at least one pixel neighboring the first pixel is from a different color channel than the color channel of the first pixel.

17. A method of encoding image information, the method comprising:
 providing a first image and a second image, the first image comprising a lower dynamic range representation of the image information and the second image comprising higher dynamic range representation of the image information;
 encoding the first image to generate a first layer bitstream;
 reconstructing the first image to obtain a reconstructed first image, wherein the reconstructed first image is adapted to be stored in a first reference picture buffer;
 generating context information for one or more pixels in the reconstructed first image, wherein context information associated with a first pixel in the one or more pixels is based on at least one pixel neighboring the first pixel;
 estimating an inverse mapping function from the generated context information and values of the one or more pixels in the reconstructed first image, the inverse mapping function being adapted to map a value from the lower dynamic range to the higher dynamic range;
 computing an estimated second image based on applying the inverse mapping function to the one or more pixels of the reconstructed first image and, for each remaining pixel of the reconstructed first image, inverse mapping the remaining pixel from the lower dynamic range to the higher dynamic range based on pixel value associated with the remaining pixel to generate the estimated second image, wherein the estimated second image is adapted to be stored in a second reference picture buffer; and
 encoding the estimated second image to generate a second layer bitstream,
 wherein:
 the at least one pixel neighboring the first pixel comprises neighboring pixels on a different channel than the first pixel, and
 the generating of context information comprises reading values of the at least one pixel neighboring the first pixel.

18. The method according to claim 17, wherein the inverse mapping remaining pixels comprises at least one of polynomial mapping, linear mapping, table lookup, multivariate multiple regression, or slope offset power.

19. The method according to claim 18, wherein the lookup table is differentially coded.

20. The method according to claim 17, wherein the generating of context information comprises performing one of:
computing a weighted average of the at least one pixel neighboring the first pixel;
computing a linear combination of the at least one pixel neighboring the first pixel;
computing a gradient of the at least one pixel neighboring the first pixel;
computing texture information based on the at least one pixel neighboring the first pixel; and
computing a gradient covariance matrix based on the at least one pixel neighboring the first pixel.

21. The method according to claim 17, wherein:
the generating of context information comprises performing, for a first pixel in the one or more pixels of the reconstructed first image, at least one of:
   (i) computing a weighted average of the at least one pixel neighboring the first pixel to generate a first set of context information;
   (ii) computing a linear combination of the at least one pixel neighboring the first pixel to generate a second set of context information;
   (iii) computing a gradient of the at least one pixel neighboring the first pixel to generate a third set of context information;
   (iv) computing texture information based on the at least one pixel neighboring the first pixel to generate a fourth set of context information; and
   (v) computing a gradient covariance matrix based on the at least one pixel neighboring the first pixel to generate a fifth set of context information; and
the estimating of the inverse mapping function comprises:
estimating a corresponding inverse mapping function for each generated set of context information from among the generated sets of context information; and
selecting the inverse mapping function corresponding to one set of context information from among the generated sets of context information, based on a metric.

22. The method according to claim 21, wherein the estimating of the inverse mapping function comprises:
for each generated set of context information:
estimating an inverse mapping function from the generated set of context information and values of the one or more pixels in the reconstructed first image, the estimated inverse mapping function being adapted to map a value from the lower dynamic range to the higher dynamic range;
computing an estimated second image based on applying the inverse mapping function to the one or more pixels of the reconstructed first image and, for each remaining pixel of the reconstructed first image, inverse mapping the remaining pixel from the lower dynamic range to the higher dynamic range based on pixel value associated with the remaining pixel to generate the estimated second image, wherein the estimated second image is adapted to be stored in a second reference picture buffer; and
computing a metric based on a difference between the estimated second image and the provided second image; and
selecting the estimated inverse mapping function associated with the generated set of context information corresponding to the lowest computed metric.

23. The method according to claim 22, wherein the inverse mapping function comprises at least one of polynomial mapping, linear mapping, table lookup, multivariate multiple regression, or slope offset power.

24. The method according to claim 23, wherein the lookup table is differentially coded.

25. The method according to claim 22, wherein the computing of the metric comprises:
computing a distortion metric as the computed metric, wherein the distortion metric is a function of the difference between the estimated second image and the provided second image and a number of bits used to signal mode of the generating of the context information.

26. The method according to claim 17, further comprising, prior to encoding the estimated second image:
subtracting the estimated second image from the provided second image to obtain a residual,
wherein the encoding comprises encoding the residual.

27. The method according to claim 26, further comprising resampling and/or quantizing the residual prior to encoding the residual.

28. The method according to claim 17, further comprising signaling the estimated inverse mapping function.

29. The method according to claim 28, wherein the signaling comprises generating a header file comprising information associated with the estimated inverse mapping function.

30. The method according to claim 17, wherein the at least one pixel neighboring the first pixel is from a different color channel than the color channel of the first pixel.

* * * * *